United States Patent
Zhou et al.

(10) Patent No.: US 12,457,027 B2
(45) Date of Patent: Oct. 28, 2025

(54) ADAPTATION OF PREDETERMINED BEAM SWITCHING

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US)

( * ) Notice: Subject to any disclaimer, the term of this patent is extended or adjusted under 35 U.S.C. 154(b) by 300 days.

(21) Appl. No.: 18/156,567

(22) Filed: Jan. 19, 2023

(65) Prior Publication Data
US 2023/0155717 A1    May 18, 2023

Related U.S. Application Data

(62) Division of application No. 16/717,526, filed on Dec. 17, 2019, now Pat. No. 11,563,510.
(Continued)

(51) Int. Cl.
*H04B 7/08* (2006.01)
*H04B 7/06* (2006.01)
(Continued)

(52) U.S. Cl.
CPC ......... *H04B 7/0696* (2023.05); *H04B 7/0686* (2013.01); *H04B 7/0814* (2013.01);
(Continued)

(58) Field of Classification Search
CPC .. H04B 7/0686; H04B 7/0695; H04B 7/0814; H04B 7/088; H04L 1/0003; H04L 1/08;
(Continued)

(56) References Cited

U.S. PATENT DOCUMENTS

| | | | |
|---|---|---|---|
| 10,567,065 B2 * | 2/2020 | Kundargi | ............. H04B 7/0695 |
| 2012/0119953 A1 | 5/2012 | Hosoya et al. | |

(Continued)

FOREIGN PATENT DOCUMENTS

| | | | | |
|---|---|---|---|---|
| CN | 107567038 A | | 1/2018 | |
| WO | WO-2018064372 A1 | * | 4/2018 | ........... H04B 7/0617 |
| WO | WO-2018156435 A1 | | 8/2018 | |

OTHER PUBLICATIONS

International Preliminary Report on Patentability—PCT/US2019/067246, The International Bureau of WIPO—Geneva, Switzerland, Jul. 1, 2021.
(Continued)

*Primary Examiner* — Phuc H Tran

(57) ABSTRACT

Methods, systems, and devices for wireless communications are described. Communications by wireless devices may be modified when beam pair links (BPLs) experience decreased link quality. For example, a controlling wireless device may communicate with a secondary wireless device using a set of BPLs. The controlling and secondary wireless device may each cycle through the set of BPLs at respective times of a communication time period. Upon detecting one or more BPLs having a decreased link quality during a portion of the communication time period, the controlling wireless device may transmit a configuration modifying the communications. For instance, the modified communications may include replacing the one or more BPLs with different BPLs having a relatively higher link quality. In other cases, the modified communications may include using repeated transmissions during the portion of the communication time period or excluding the BPLs experiencing decreased link quality from the communication time period.

30 Claims, 13 Drawing Sheets

Related U.S. Application Data

(60) Provisional application No. 62/784,330, filed on Dec. 21, 2018.

(51) Int. Cl.
   *H04L 1/00* (2006.01)
   *H04L 1/18* (2023.01)
   *H04W 72/044* (2023.01)
   *H04W 72/542* (2023.01)

(52) U.S. Cl.
   CPC ............ *H04L 1/0003* (2013.01); *H04L 1/18* (2013.01); *H04W 72/046* (2013.01); *H04W 72/542* (2023.01)

(58) Field of Classification Search
   CPC .... H04L 1/18; H04W 72/046; H04W 72/541; H04W 72/542
   See application file for complete search history.

(56) References Cited

U.S. PATENT DOCUMENTS

| | | | |
|---|---|---|---|
| 2018/0241452 A1* | 8/2018 | Akkarakaran | H04W 72/0446 |
| 2018/0255607 A1 | 9/2018 | Nagaraja et al. | |
| 2019/0150013 A1 | 5/2019 | Zhang et al. | |
| 2020/0204288 A1 | 6/2020 | Zhou et al. | |
| 2020/0244413 A1 | 7/2020 | Takeda et al. | |
| 2020/0373988 A1 | 11/2020 | Wang et al. | |
| 2020/0389220 A1 | 12/2020 | Kang et al. | |

OTHER PUBLICATIONS

International Search Report and Written Opinion—PCT/US2019/067246—ISA/EPO—Mar. 19, 2020.

* cited by examiner

ADAPTATION OF PREDETERMINED BEAM SWITCHING

CROSS REFERENCE

The present Application for Patent is a Division of U.S. patent application Ser. No. 16/717,526 by ZHOU et al., entitled "ADAPTATION OF PREDETERMINED BEAM SWITCHING," filed Dec. 17, 2019, which claims priority to U.S. Provisional Patent Application No. 62/784,330 by ZHOU et al., entitled "ADAPTATION OF PREDETERMINED BEAM SWITCHING," filed Dec. 21, 2018; which is assigned to the assignee hereof, and which is expressly incorporated herein.

BACKGROUND

The following relates generally to wireless communications, and more specifically to adaptation of predetermined beam switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations, transmission/reception points (TRPs), or network access nodes, each simultaneously supporting communication for multiple communication devices, which may be otherwise known as user equipment (UE). In some wireless communications systems, wireless devices (such as a base station and UE) may communicate using directional beams (e.g., directional transmit beams and directional receive beams) that form beam pair links (BPLs) for exchanging data packets. In some cases, the wireless devices may modify one or more BPLs used to communicate, for example, due to the mobility of one or both of the devices. However, conventional techniques for dynamically managing BPLs may be deficient.

SUMMARY

The described techniques relate to improved methods, systems, devices, and apparatuses that support adaptation of predetermined beam switching. Generally, the described techniques provide for dynamically modifying communications between wireless devices when one or more beam pair links (BPLs) are affected by a degraded link quality. For example, a first wireless device (e.g., a controlling wireless device, which may be an example of a base station) may communicate with a second wireless device (e.g., a secondary wireless device, which may be an example of a user equipment (UE)) using a set of BPLs. The first wireless device and the second wireless device may cycle through the set of BPLs at respective times of a communication time period, where each BPL of the set of BPLs may correspond to a different position of the second wireless device based on a predetermined movement pattern.

In some cases, one or more BPLs during a portion of the communication time period may experience decreased link quality (e.g., as compared to a threshold, as compared to an initial measured link quality, etc.), and the first wireless device may transmit a configuration that modifies the communications between the first and second wireless devices based on the one or more affected BPLs. For instance, the modified communication may include replacing the one or more BPLs having a decreased link quality with other BPLs that have relatively higher link quality (e.g., that satisfies a threshold), which may be based on measurements performed by the second wireless device. Additionally or alternatively, the modified communications may include using repeated transmissions during the portion of the communication time period to enable a robust transmissions of data packets. In other examples, the modification to the communications may include updating the communication time period to exclude the portion of the communication time period and corresponding BPLs experiencing the decreased link quality. In any event, dynamically modifying the set of BPL, the communication time period, or both, may ensure sustained communications efficiency between the first and second wireless device in the presence of varying communications conditions.

A method of wireless communication at a controlling wireless device is described. The method may include communicating with a secondary wireless device by cycling through a set of BPLs at respective times within a communication time period, identifying, for a portion of the communication time period, at least one BPL of the set of BPLs having a link quality that does not satisfy a threshold, and transmitting, to the secondary wireless device, a configuration that modifies communications with the secondary wireless device during the portion of the communication time period.

An apparatus for wireless communication at a controlling wireless device is described. The apparatus may include a processor, memory in electronic communication with the processor, and instructions stored in the memory. The instructions may be executable by the processor to cause the apparatus to communicate with a secondary wireless device by cycling through a set of BPLs at respective times within a communication time period, identify, for a portion of the communication time period, at least one BPL of the set of BPLs having a link quality that does not satisfy a threshold, and transmit, to the secondary wireless device, a configuration that modifies communications with the secondary wireless device during the portion of the communication time period.

Another apparatus for wireless communication at a controlling wireless device is described. The apparatus may include means for communicating with a secondary wireless device by cycling through a set of BPLs at respective times within a communication time period, identifying, for a portion of the communication time period, at least one BPL of the set of BPLs having a link quality that does not satisfy a threshold, and transmitting, to the secondary wireless device, a configuration that modifies communications with the secondary wireless device during the portion of the communication time period.

A non-transitory computer-readable medium storing code for wireless communication at a controlling wireless device is described. The code may include instructions executable by a processor to communicate with a secondary wireless device by cycling through a set of BPLs at respective times within a communication time period, identify, for a portion of the communication time period, at least one BPL of the set of BPLs having a link quality that does not satisfy a threshold, and transmit, to the secondary wireless device, a configuration that modifies communications with the secondary wireless device during the portion of the communication time period.

Some examples of the method, apparatuses, and non-transitory computer-readable medium described herein may further include operations, features, means, or instructions for determining, based on the at least one BPL having the link quality that does not satisfy the threshold, at least one other BPL having a link quality that satisfies the threshold during the portion of the communication time period, and where the configuration that modifies the communications with the secondary wireless device replaces the at least one BPL and a corresponding time with the at least one other BPL and another corresponding time for the portion of the communication time period.

Some examples of the method, apparatuses, and non-transitory computer-readable medium described herein may further include operations, features, means, or instructions for transmitting a signal requesting the secondary wireless device perform measurements for the portion of the communication time period, and receiving, from the secondary wireless device and in response to the signal, a measurement report for the portion of the communication time period, where the at least one other BPL and the other corresponding time may be based on the received measurement report.

Some examples of the method, apparatuses, and non-transitory computer-readable medium described herein may further include operations, features, means, or instructions for communicating with the secondary wireless device during a subsequent instance of the communication time period by cycling through the set of BPLs, including the at least one other BPL and the other corresponding time, and excluding the at least one BPL based on the configuration.

Some examples of the method, apparatuses, and non-transitory computer-readable medium described herein may further include operations, features, means, or instructions for determining, based on the at least one BPL having the link quality that does not satisfy the threshold, to utilize repeated transmissions during the portion of the communication time period, where the configuration that modifies the communications with the secondary wireless device enables the repeated transmissions.

In some examples of the method, apparatuses, and non-transitory computer-readable medium described herein, the repeated transmissions include at least one of repetitions of a packet using a same BPL or repetitions of the packet using two or more different BPLs. In some examples of the method, apparatuses, and non-transitory computer-readable medium described herein, the repeated transmissions include simultaneous repetitions of a packet using two or more BPLs.

Some examples of the method, apparatuses, and non-transitory computer-readable medium described herein may further include operations, features, means, or instructions for determining at least one of a number of repeated transmissions, a corresponding BPL for each of the repeated transmissions, or corresponding BPLs for simultaneous transmissions, and where the configuration that modifies the communications with the secondary wireless device includes an indication of at least one of the number of repeated transmissions, the corresponding BPLs for each of the repeated transmissions, or the corresponding BPLs for the simultaneous transmissions.

In some examples of the method, apparatuses, and non-transitory computer-readable medium described herein, the configuration that modifies the communications with the secondary wireless device includes an adjusted communication time period that excludes the portion of the communication time period.

Some examples of the method, apparatuses, and non-transitory computer-readable medium described herein may further include operations, features, means, or instructions for transmitting, to the secondary wireless device, an indication to resume operation in accordance with the communication time period, where the operation may be resumed from at least one of a beginning of the communication time period or a designated time of the communication time period. In some examples of the method, apparatuses, and non-transitory computer-readable medium described herein, the set of BPLs may be pre-determined based on at least one of a position of the secondary wireless device or an orientation of the secondary wireless device.

A method of wireless communications at a secondary wireless device is described. The method may include communicating with a controlling wireless device by cycling through a set of BPLs at respective times within a communication time period and receiving, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

An apparatus for wireless communications at a secondary wireless device is described. The apparatus may include a processor, memory in electronic communication with the processor, and instructions stored in the memory. The instructions may be executable by the processor to cause the apparatus to communicate with a controlling wireless device by cycling through a set of BPLs at respective times within a communication time period and receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

Another apparatus for wireless communications at a secondary wireless device is described. The apparatus may include means for communicating with a controlling wireless device by cycling through a set of BPLs at respective times within a communication time period and receiving, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

A non-transitory computer-readable medium storing code for wireless communications at a secondary wireless device is described. The code may include instructions executable by a processor to communicate with a controlling wireless device by cycling through a set of BPLs at respective times within a communication time period and receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

Some examples of the method, apparatuses, and non-transitory computer-readable medium described herein may further include operations, features, means, or instructions for receiving a signal requesting the secondary wireless device perform measurements for the portion of the communication time period, performing a set of measurements for at least one other BPL during the portion of the communication time period, and transmitting, to the controlling wireless device and in response to the signal, a measurement report for the portion of the communication time period.

In some examples of the method, apparatuses, and non-transitory computer-readable medium described herein, the configuration that modifies the communications with the secondary wireless device replaces the at least one BPL and a corresponding time with the at least one other BPL and another corresponding time for the portion of the communication time period, the at least one other BPL having a link quality that satisfies the threshold based on the set of measurements.

Some examples of the method, apparatuses, and non-transitory computer-readable medium described herein may further include operations, features, means, or instructions for communicating with the controlling wireless device by cycling through the set of BPLs including the at least one other BPL and the other corresponding time and excluding the at least one BPL during a subsequent instance of the communication time period based on the configuration.

Some examples of the method, apparatuses, and non-transitory computer-readable medium described herein may further include operations, features, means, or instructions for pausing operations of the secondary wireless device while performing the set of measurements. In some examples of the method, apparatuses, and non-transitory computer-readable medium described herein, the configuration that modifies the communications with the controlling wireless device enables repeated transmissions during the portion of the communication time period.

In some examples of the method, apparatuses, and non-transitory computer-readable medium described herein, the repeated transmissions include at least one of repetitions of a packet using a same BPL or repetitions of the packet using two or more different BPLs. In some examples of the method, apparatuses, and non-transitory computer-readable medium described herein, the repeated transmissions include simultaneous transmissions of a packet using two or more BPLs.

In some examples of the method, apparatuses, and non-transitory computer-readable medium described herein, the configuration that modifies the communications with the controlling wireless device includes an indication of at least one of a number of repeated transmissions, a corresponding BPL for each repeated transmission, or corresponding BPLs for simultaneous transmissions. In some examples of the method, apparatuses, and non-transitory computer-readable medium described herein, the configuration that modifies the communications with the controlling wireless device includes an adjusted communication time period that excludes the portion of the communication time period.

Some examples of the method, apparatuses, and non-transitory computer-readable medium described herein may further include operations, features, means, or instructions for receiving, from the controlling wireless device, an indication to resume operation in accordance with the communication time period, where the operation may be resumed from at least one of a beginning of the communication time period or a designated time of the communication time period.

DETAILED DESCRIPTION

Figure 1:
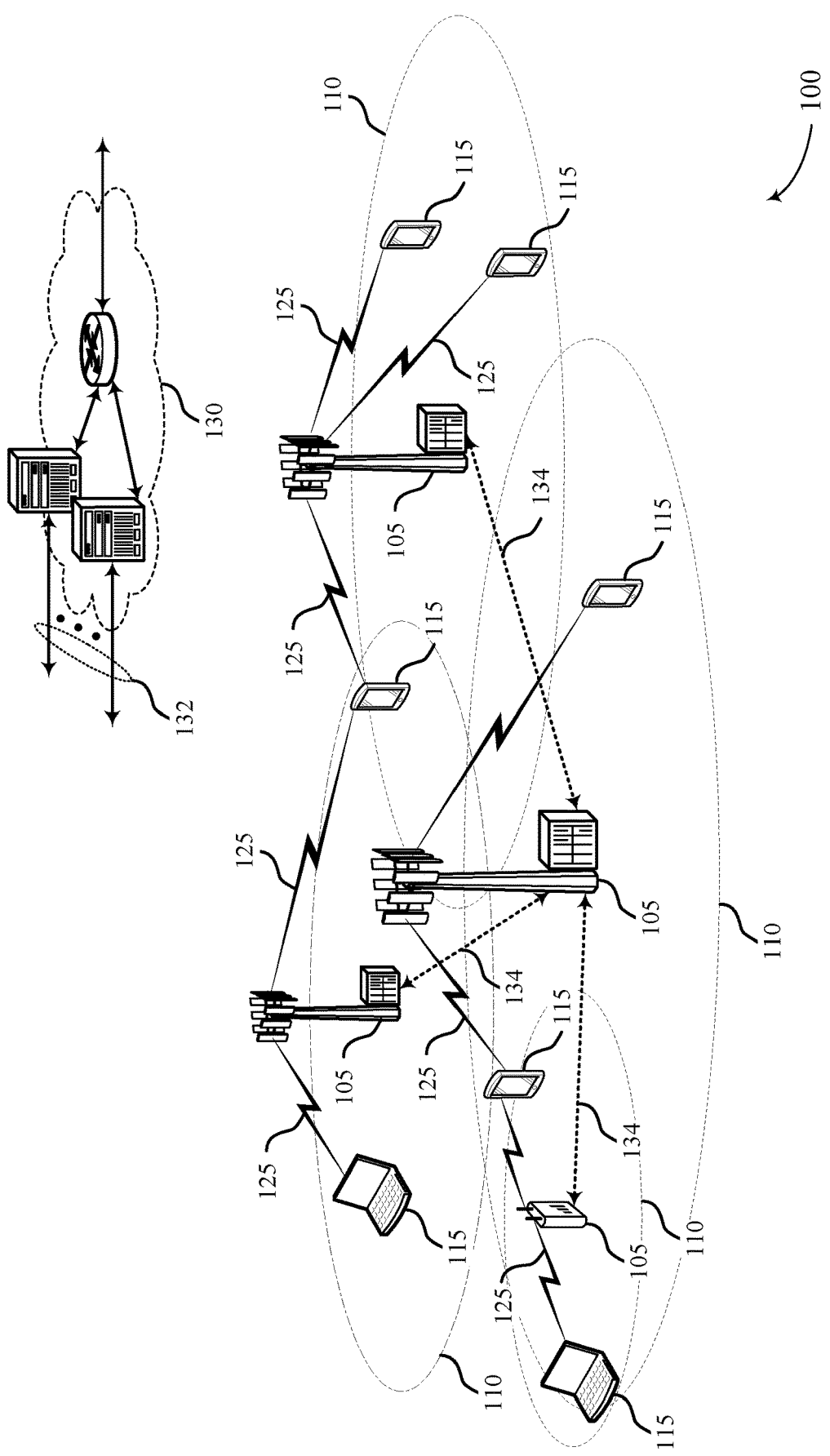
FIG. 1 illustrates an example of a wireless communications system that supports adaptation of predetermined beam switching in accordance with aspects of the present disclosure.

Some wireless communication systems may operate in millimeter wave (mmW) frequency ranges, e.g., 25 gigahertz (GHz), 40 GHz, 60 GHz, etc. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via directional beams (e.g., beamformed for transmission and reception using an antenna array at the wireless device). For example, two or more wireless devices may communicate via beam pair links (BPLs), where each BPL includes a transmit beam of one wireless device (e.g., a user equipment (UE)) and a receive beam of another wireless device (e.g., a base station, another UE, a transmission/reception point (TRP), etc.).

In some systems, such as systems that support industrial Internet of Things (IoT), wireless devices may switch between different BPLs, for example, based on the movement and/or location of the wireless device. A wireless device, such as a UE, may perform a series of movements for a certain task or process that it is programmed to complete, and such operation of the UE may be predetermined and/or repeated by the UE. As such, BPL switching performed by the UE and base station may also be predetermined. The BPL switching may include cyclically changing BPLs at respective times (or time intervals) within a communication time period, which may be based on the location or position of the UE.

However, the UE may operate in an environment that dynamically changes from the time the training is performed. For example, in some communications environments, a particular predetermined BPL may be blocked or interfered with by other objects or other devices during operation of the UE, which may thus affect at least one of the predetermined BPLs at a corresponding time of the communication time period. As a result, one or more predetermined BPLs may experience poor performance in at least a portion of the communication time period. Thus, predetermined BPLs that had previously satisfied a link quality threshold (e.g., at the time of beam training), may later fail to provide a suitable communication link between the UE and base station.

As described herein, for one or more BPLs that experience a decreased link quality for at least a portion of a communication time period, the affected BPL(s) may be updated by re-training the BPLs corresponding to the portion of the communication time period. For instance, one or more BPLs used by a UE and base station may experience interference that degrades the link quality (e.g., such that the link quality fails to satisfy a threshold) within at least a portion of a communication time period. The base station may signal, to the UE, a request to perform one or more measurements of BPLs during the time period having the degraded link quality (e.g., to identify candidate BPLs that have a link quality that satisfies the threshold). The UE may report the measurements to the base station, and the base station may signal an updated local communication time period to replace, for example, BPLs and corresponding times within a portion of the communication time period experiencing degraded quality. In such cases, the BPLs and corresponding times may be replaced with other BPLs (and their corresponding times) that satisfy the threshold based on the measurement report. The UE and base station may then communicate using the updated communication time period that includes the updated BPLs.

In some cases, the UE and base station may use communications techniques that enable repeated transmissions during the portion of the communication time period experiencing decreased link quality. For example, when signaling a configuration for the portion of the communication time period, a base station may signal that the UE may transmit and receive repetitions of a packet during the portion determined to have degraded link quality. The repeated transmissions may include sending repetitions of the packet with a same BPL, or with different BPLs. Additionally or alternatively, a same packet may be simultaneously transmitted and received using multiple BPLs. In other cases, a base station may use multiple BPLs to simultaneously transmit a repeated packet to the UE, and the UE may likewise receive the packet using multiple panels (and multiple BPLs). In some examples, the base station may update the entire communication time period. For example, the base station may provide, to the UE, an updated communication time period that skips the portion that includes the BPLs with degraded link quality. Additionally or alternatively, corresponding UE movement associated with the removed time period (and BPLs) may be excluded. In any event, after an updated configuration of the communication time period is signaled to the UE, the base station may signal the UE to resume operation by starting from the beginning of the communication time period, or resume at a particular point of the communication time period (e.g., at a particular time in the middle of the timeframe).

Particular aspects of the subject matter described herein may be implemented to realize one or more advantages. The described techniques may support improvements in communication between the UE and the base station by increasing the link quality of degraded BPLs. For example, establishing new BPLs based upon the location of the UE may replace degraded BPLs and therefore the communication efficiency between the UE and the base station may be increased. As such, the supported techniques may include improved UE operations, improved base station operations, and may promote network efficiencies, among other benefits.

Aspects of the disclosure are initially described in the context of wireless communications systems. Further examples are then provided which illustrate communication time periods and the modification of communications between devices using different BPLs and robust communications schemes. Aspects of the disclosure are further illustrated by and described with reference to apparatus diagrams, system diagrams, and flowcharts that relate to the adaptation of predetermined beam switching.

FIG. 1 illustrates an example of a wireless communications system 100 that supports adaptation of predetermined beam switching in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of a BPLs within a communication time period that may be adjusted in response to dynamically changing wireless conditions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or Resource Blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit synchronization signal (SS) sequences to multiple UEs 115, and a UE 115 may attempt to detect the SS sequences by correlating received SS signals with the SS sequences. In some examples, the SSs may be transmitted by the base station 105 using one or more SS blocks (e.g., time-frequency resources used for the transmission of SSs). For example, primary synchronization signal (PSS), secondary synchronization sign (SSS), and/or broadcast information (e.g., a physical broadcast channel (PBCH)) may be transmitted within different SS blocks on respective directional beams or on different time/frequency resources. In some cases, one or more SS blocks may be included within an SS burst. Additionally, SS blocks may be quasi-co located (QCL'ed) with other signals transmitted within wireless communications system 100).

A UE 115 may be configured with one or more transmission configuration indicator (TCI) state configurations. Different TCI states, distinguished by different values of the TCI, may correspond to quasi co-location (QCL) relationships with different reference signal transmissions. For example, each TCI state may be associated with one of the previously received reference signals. The TCI state may provide a spatial QCL reference that the UE 115 can use to set the receive beam. By configuring the TCI states at the UE 115, the base station 105 can dynamically select beams for downlink transmission to the UE 115, and the UE 115 can select the corresponding receive beam to receive the downlink transmission. For a downlink transmission, the base station 105 may transmit an indication of the TCI state to the UE 115, and the UE 115 may select the corresponding receive beam based on the indicated TCI state to receive the downlink transmission. The TCI states may be configured via higher layer signaling.

In some cases, a UE 115 may be configured with one or more control-resource sets (CORESETs), where each CORESET may be associated with a particular mapping between control channel elements (CCEs) and resource element groups (REGs). A CORESET may include a number of RBs in the frequency domain and a number of symbols in the time domain. For instance, CORESETs may be configured for the transmission of control information (e.g., a physical downlink control channel (PDCCH)), for example, in one or more contiguous symbols in the time domain and one or more contiguous or non-contiguous resources in the frequency domain. In some cases, resource elements (REs) in a CORESET may be organized in REGs, where each REG includes 12 REs of a symbol period in an RB. In some cases, CORESETs may be configured for the UE 115 using higher-layer parameters (e.g., RRC signaling).

PDCCH carries downlink control information (DCI) in CCEs, which may include nine logically contiguous REGs, where each REG contains four REs. DCI includes information regarding downlink scheduling assignments, uplink resource grants, transmission scheme, uplink power control, HARQ information, a modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell-radio network temporary identifier (C-RNTI) and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

An sounding reference signal (SRS) may be transmitted by a UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, the SRS may be transmitted during a temporally last OFDM symbol of the subframe or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

Wireless communications system 100 may support dynamic modification of communications between wireless devices when one or more BPLs are affected by a degraded link quality. For example, a first wireless device (e.g., a controlling wireless device, which may be an example of a base station 105, a TRP, a UE 115, a motion controller, etc.) may communicate with a second wireless device (e.g., a secondary wireless device, which may be an example of a UE 115) using a set of BPLs. The first wireless device and the second wireless device may cycle through the set of BPLs at respective times of a communication time period, where each BPL of the set of BPLs may correspond to a different position of the second wireless device based on a predetermined movement pattern of the second wireless device. More specifically, the second wireless device may operate in an industrial IoT system (such as a mechanical device operating in a factory) and may perform a number of predetermined operations and movements to complete a programmed task. The predetermined movement pattern may thus be based on the operations and movements of the second wireless device, and different BPLs may be used at different instances of the device's motion, for example, based on the location or position of the device.

In some cases, one or more BPLs during a portion of the communication time period may experience decreased link quality (e.g., as compared to a threshold, as compared to an initial measured link quality, etc.), and the first wireless device may transmit a configuration that modifies the communications between the first and second wireless device based on the affected BPLs. For instance, the modified communication may include replacing the one or more BPLs having a decreased link quality with other BPLs that have relatively higher link quality (e.g., that satisfies a threshold), which may be based on measurements performed by the second wireless device. Additionally or alternatively, the modified communications may include using repeated transmissions during the portion of the communication time period to enable a robust transmissions of data packets. In other examples, the modification to the communications may include updating the communication time period to exclude the portion of the communication time period and corresponding BPLs experiencing the decreased link quality (such that those BPLs may no longer be cycled through during the updated communication time period). In any event, dynamically modifying the set of BPL, the communication time period, or both, may ensure sustained communications efficiency between the first and second wireless device in the presence of varying communications conditions.

Figure 2:
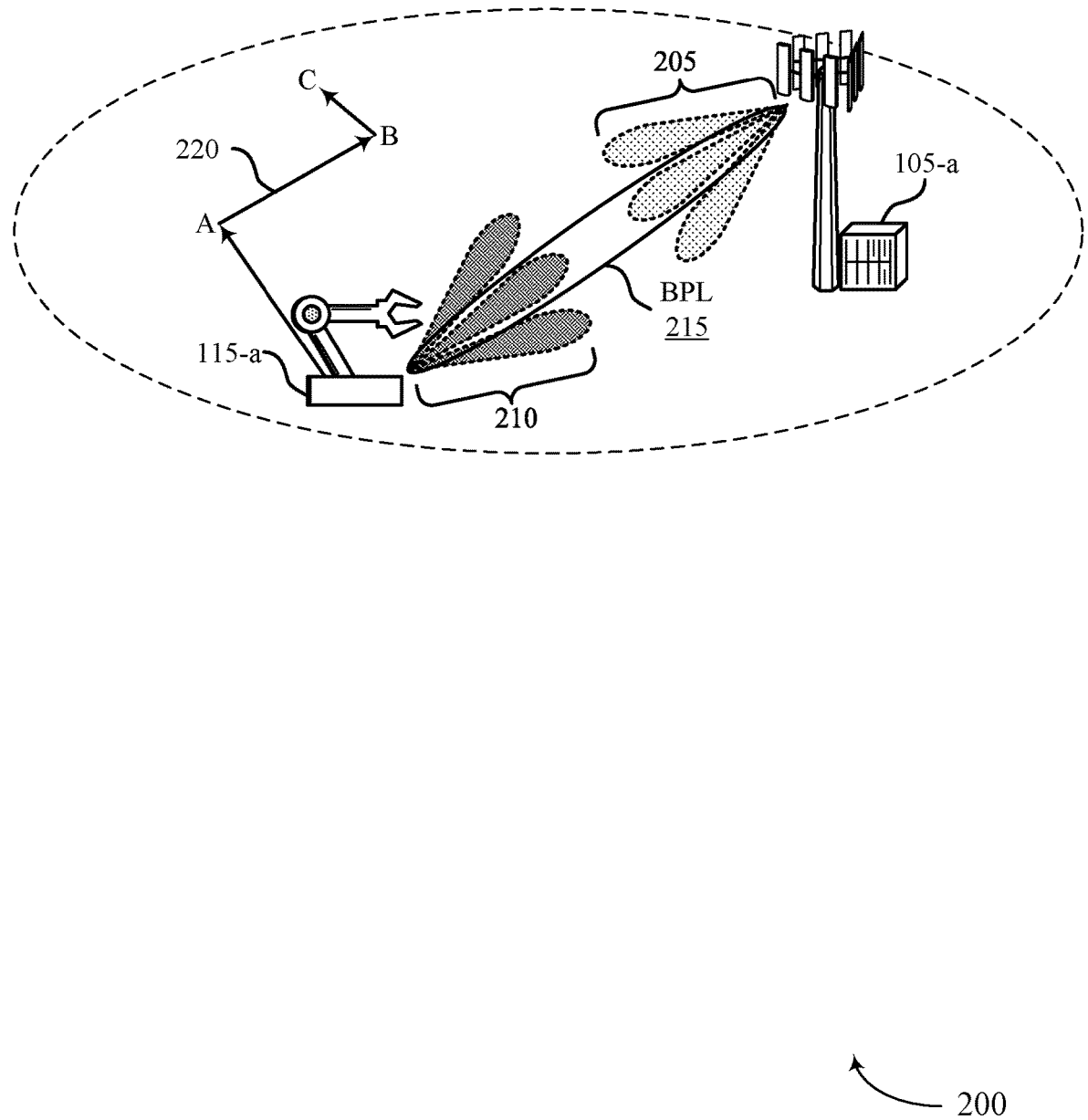
FIG. 2 illustrates an example of a wireless communications system that supports adaptation of predetermined beam switching in accordance with aspects of the present disclosure.

FIG. 2 illustrates an example of a wireless communications system 200 that supports adaptation of predetermined beam switching in accordance with aspects of the present disclosure. In some examples, wireless communications system 200 may implement aspects of wireless communications system 100. For example, wireless communications system may include a base station 105-a and a UE 115-a, which may be examples of the corresponding devices described with reference to FIG. 1. In some cases, wireless communications system 200 may be an example of a system that supports industrial IoT, and UE 115-a may be an example of a machine or robot capable of performing a specified task or operation. Further, base station 105-a may be an example of a motion controller that controls the operation of behavior of UE 115-a. Wireless communications system 200 may support the adaptation of pre-determined beam switching based on, for example, the movement of UE 115-a. The adaptation may enable the devices in wireless communications system 200 to dynamically modify communications schemes to improve wireless communications efficiency.

In wireless communications system 200, base station 105-a and UE 115-a may communicate using directional beams. For example, base station 105-a may use beamforming techniques to form a set of base station beams 205 used for transmitting and receiving wireless signals. Likewise, UE 115-a may form a set of UE beams 210 for transmitting and receiving wireless signals. In some cases, UE 115-a and base station 105-a may perform procedures to identify one or more beams that provide a highest signal or link quality (e.g., compared to other beams within a set of base station beams 205 and UE beams 210), which may include the measurement of one or more reference signals (e.g., channel state information reference signal (CSI-RS), SS Blocks, etc.) transmitted by base station 105-a. UE 115-a and base station 105-a may each identify one or more pairs of corresponding beams that provide a link to communicate data between the devices. As such, UE 115-a and base station 105-a may establish a communication link using a beam pair link 215.

As an example of establishing a communication link, the BPL 215 may include a transmission beam formed by the transmitting entity and directional listening implemented by the receiving entity. For example, in downlink communications, base station 105-a may use a phased-array antenna to form a directional transmission beam and UE 115-a may use directional listening. In some cases, a base station beam 205 (e.g., directional listening beam or transmission beam) formed by base station 105-a may be larger than a UE beam 210 (e.g., a transmission beam or direction listening) formed by UE 115-a (e.g., because base station 105-a may have a larger array of antennas to perform beamforming). In uplink communications, the roles of base station 105-a and UE 115-a may be reversed. In some cases, wireless communications system 200 may operate in shared radio frequency band spectrum. As such, wireless communications system 200 may use contention-based protocols to gain access communication resources. In other examples, wireless communications system 200 may operate in licensed radio frequency spectrum bands, where communications may be scheduled by base station 105-a.

UE 115-a and base station 105-a may switch between different BPLs 215, for example, based on the movement and/or location of UE 115-a. As an example, UE 115-a may be an example of a machine or robot operating in a factory or warehouse. UE 115-a may perform a series of movements for a certain task or process that it is programmed to complete. In some cases, this operation of UE 115-a may be predetermined (e.g., preconfigured), and UE 115-a may repeat these predetermined movements. For instance, UE 115-a may move between points (e.g., points A, B, and C, as illustrated) in accordance with a predetermined movements. As such, BPL switching performed by UE 115-a and base station may likewise be predetermined (e.g., to reduce overhead associated with beam switch measurements, reporting, signaling, etc.). BPL switching may include cyclically adjusting or changing BPLs 215 at respective times (or time intervals) within a communication time period, which may be based on a location or position of UE 115-a.

To determine the predetermined BPL switching configuration for the communication period, UE 115-a may perform the predetermined movements during a measurement period. UE 115-a and base station 105-a may record BPLs 215 that have a link quality that satisfies a threshold (e.g., a threshold associated with a reference signal received power (RSRP), reference signal received quality (RSRQ), block error rate (BLER), signal to noise ratio (SNR), signal to interference-plus-noise ratio (SINR), or the like), where each measurement may be performed at respective times of the measurement period. That is, UE 115-a and base station 105-a may perform a beam training procedure to identify BPLs 215 having a highest link quality (as compared to other possible BPLs 215) corresponding to each movement of the UE 115-a within a predefined movement pattern. In some cases, UE 115-a and base station 105-a may sweep through the set of UE beams 210 and base station beams 205, respectively, to identify the BPLs 215 having the highest link quality. Further, while in normal operation (e.g., operating outside of a measurement/training period), UE 115-a may repeat the same series of predetermined movements, while both base station 105-a and UE 115-a switch BPLs 215 at each predetermined time based on a communication time period.

However, UE 115-a may operate in an environment that dynamically changes from the time the training is performed. For example, in an industrial IoT environment, a particular BPL 215 may be blocked or interfered with by other objects or other devices during operation, which may thus affect at least one of the pre-determined BPLs 215 at a corresponding time of the communication time period. As a result, one or more predetermined BPLs 215 may experience poor performance at least in some portion of the communication time period. As a result, predetermined BPLs 215 that have previously satisfied a link quality threshold (e.g., at the time of beam training), may later fail to provide a sufficient communication link between UE 115-a and base station 105-a.

As described herein, upon detection of at least one BPL 215 having decreased link quality (e.g., as compared to an initial quality, a previously determined quality, a threshold, etc.), base station 105-a may signal UE 115-a to perform a re-training of the at least one BPL 215 in a local period (e.g., a portion) of the communication time period based on the poor quality detected in that portion. In such cases, normal operation may or may not be paused while the training is completed. After the training is completed, base station 105-a may transmit, to UE 115-a, an updated local portion of the communication time period to replace a corresponding portion of the communication time period. More specifically, the at least one BPL 215 having decreased link quality (and their corresponding time within the communication time period) may be replaced with another set of BPLs 215 (and corresponding times) that have relatively higher link quality. In some aspects, in the updated portion of the communication time period signaled to UE 115-a, base station 105-a may specify a number of repeated transmissions and corresponding BPLs 215 per repeated transmissions. Additionally or alternatively, base station 105-a may signal a number of repeated simultaneous transmissions and corresponding BPLs 215 per simultaneous transmission. In some examples, base station 105-a may signal UE 115-a to remove a local portion of a communication time period and corresponding movements from the communication time period based on the BPLs 215 experiencing decreased link quality. Further, after the communication time period is reconfigured or reprogrammed, base station 105-a may signal UE 115-a to resume operation by starting from a beginning or any time in within the communication time period.

It is noted that the operations described herein performed by a UE 115 and base station 105 may be respectively performed by a UE 115, a base station 105, or another wireless device, and the examples shown should not be construed as limiting. For instance, the operations shown as performed by base station 105-a may be performed by a UE 115, a TRP, or another wireless device.

Figure 3:
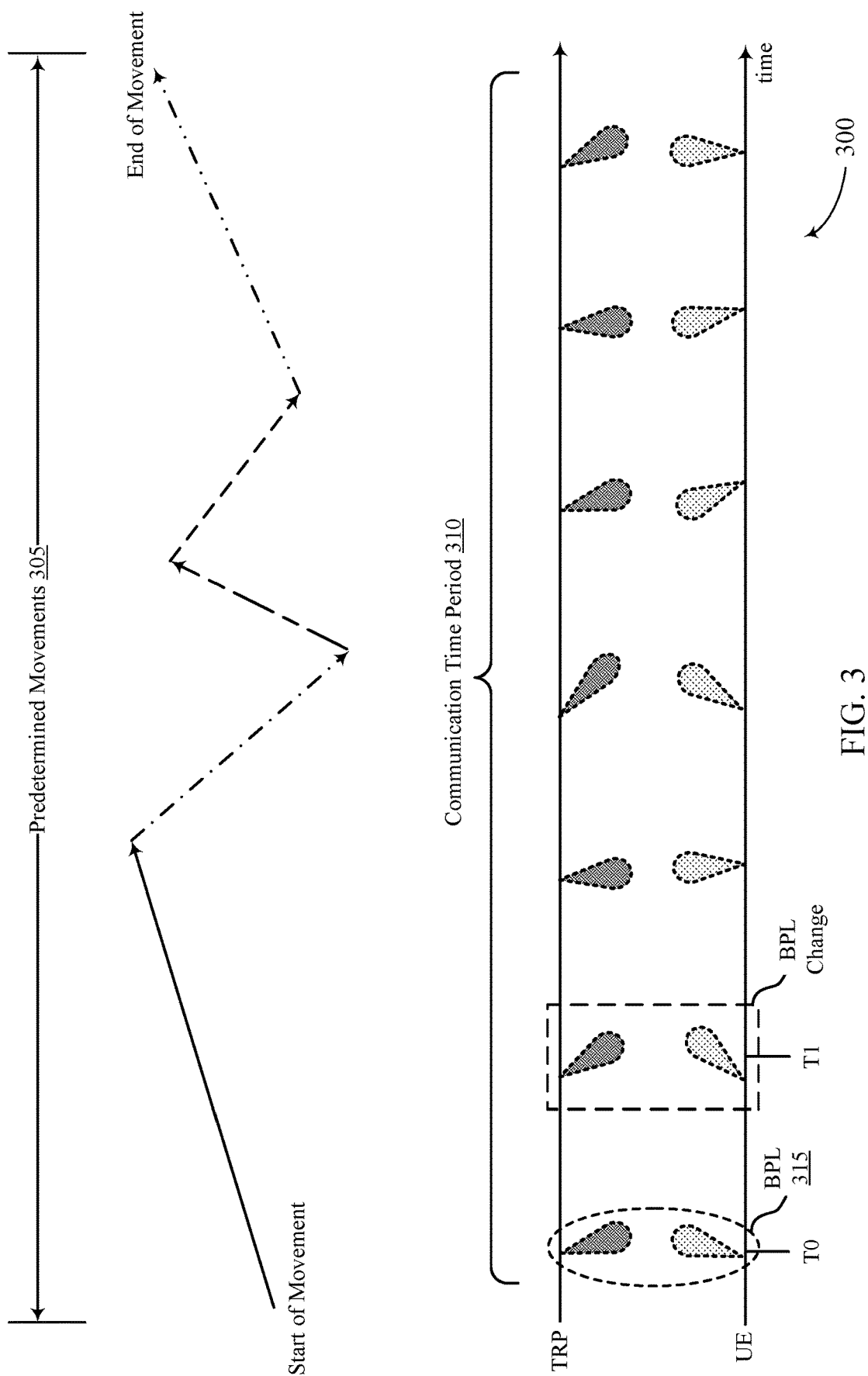
FIG. 3 illustrates an example of beam pair link (BPL) switching in a system that supports adaptation of predetermined beam switching in accordance with aspects of the present disclosure.

FIG. 3 illustrates an example of BPL switching 300 in a system that supports adaptation of predetermined beam switching in accordance with aspects of the present disclosure. In some examples, the BPL switching 300 may be performed by one or more wireless devices, such as a UE 115, a base station 105, a TRP, or other wireless devices, as described with reference to FIGS. 1 and 2.

BPL switching 300 may illustrate an example of predetermined movements 305 by a wireless device, such as a UE 115. For instance, the predetermined movements 305 may include a configured or programmed path that the UE 115 travels during a period of time. In some cases, the UE 115 may repeat the predetermined movements 305, or the predetermined movements 305 may be modified or changed (e.g., by a controlling wireless device, such as a base station 105) after a certain number of cycles. As one example, the UE 115 may be an example of machinery that performs actions over a programmed path of operation. However, this is just one example, and should not be considered as limiting as other types of UEs 115 and other predetermined movements are also considered.

The predetermined movements 305 may correspond to a communication time period 310 that includes cycling through a set of BPLs 315 at respective times, and may be referred to as a BPL time trace. As mentioned above, each BPL 315 may correspond to a transmit beam and a receive beam between, for example, a UE 115 and a TRP. At the respective times of the predetermined movements 305, different BPLs 315 may be used for communication by the wireless devices. For instance, at a first time (T0), the UE 115 and TRP may communicate using a first BPL 315, whereas at a second time (T1), the BPL 315 may change to a second BPL 315. In such cases, the change of the BPL 315 may be based on the pre-determined movement of the UE 115, which may have been configured based on training/measurements performed by the UE 115 and TRP. As such the different BPLs 315 may track the UE 115 as it moves through the predetermined movements 305.

As described in more detail below, one or more of the BPLs 315 within at least a portion of the communication time period 310 may experience interference from other wireless devices or objects. As such, a BPL 315 of the communication time period 310, and the corresponding position of the UE 115 in the predetermined movements, may be affected by degraded communications quality at least at that location in the movement of the UE 115. Consequently, the TRP may utilize the techniques described herein to modify communications by the UE 115 and TRP to improve the link quality for one or more BPLs 315.

Figure 4A:
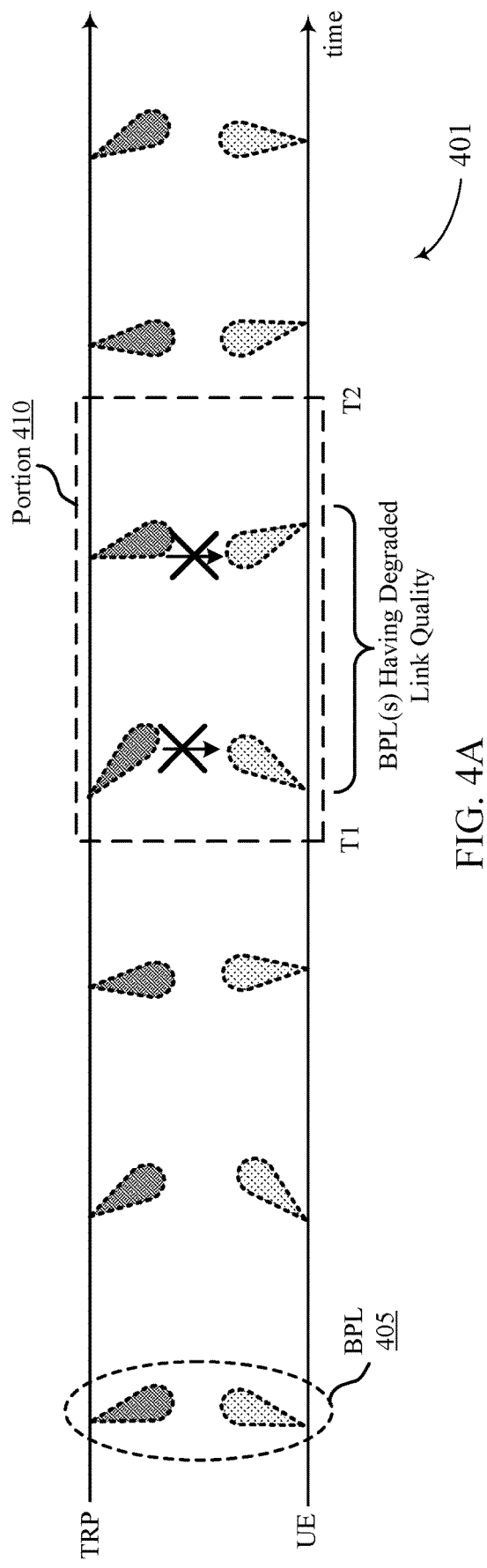
FIGS. 4A and 4B illustrate examples of communication time periods that supports adaptation of predetermined beam switching in accordance with aspects of the present disclosure.
Figure 4B:
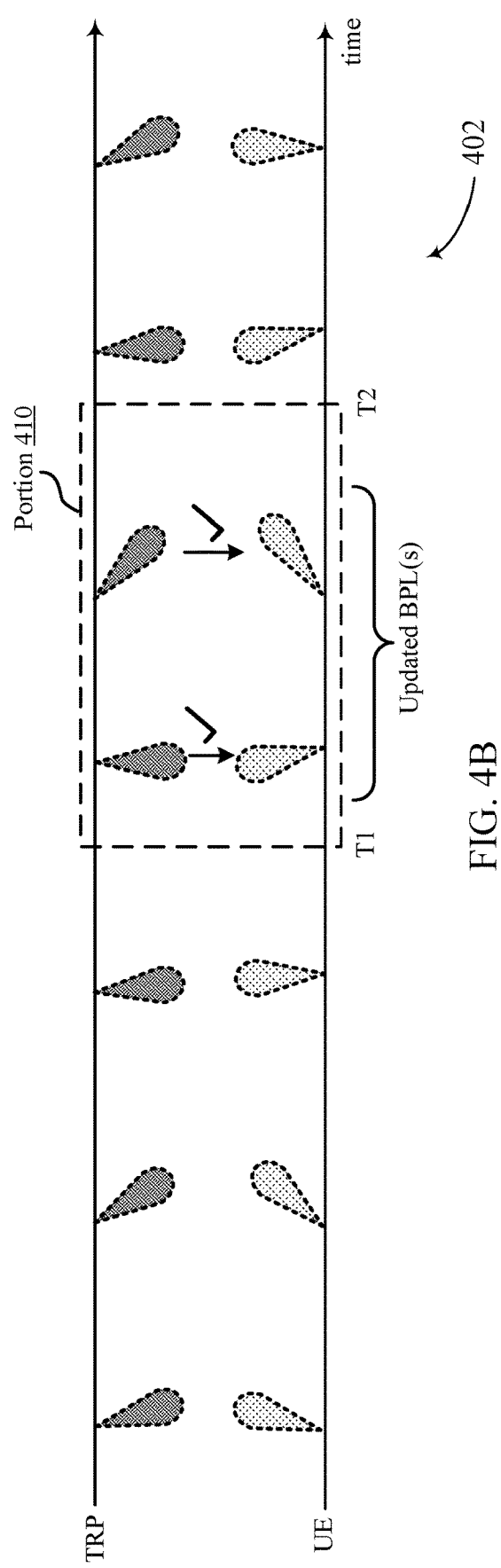

FIGS. 4A and 4B illustrate an example of a communication time period 401 and 402, respectively, that supports adaptation of predetermined beam switching in accordance with aspects of the present disclosure. In some examples, communication time period 401 and communication time period 402 may be used for communications between one or more wireless devices, such as a UE 115, a base station 105, a TRP, or other wireless devices (such as a controlling wireless device and/or a secondary wireless device), as described with reference to FIGS. 1 and 2. As illustrated, communication time period 402 may represent an updated version of communication time period 401 (e.g., where one or more BPLs have been replaced within at least a portion of the communication time periods).

For example, in communication time period 401 a UE 115 and TRP may communicate using a set of BPLs 405, where the communication may include cycling through a set of BPLs 405 at respective times. In some cases, the UE 115 or the TRP may identify at least one BPL 405 that has a link quality that has degraded. As one example, within a portion 410 of the communication time period 401, one or more BPLs 405 may have a link quality that does not satisfy a threshold due to interference or other factors in the communications environment. The portion 410 of the communications time period 401 may span between a first time (T1) and a second time (T2), and may include two BPLs 405 corresponding to respective times of the portion 410. In other examples, multiple portions 410 including BPLs 405 having BPLs 405 with a degraded link quality may be identified.

Due to the decreased link quality of the BPLs 405, transmissions using the BPLs 405 may be received with errors, or may not be received by a receiving wireless device. In cases where the one or more BPLs 405 have a decreased link quality (e.g., an increased BLER, increased retransmissions, etc.) for the portion 410 of the communication time period 401, the affected BPL(s) 405 may be updated by re-training the BPLs 405 of the portion 410. For instance, and as illustrated in communication time period 402, the affected BPL(s) 405 may be replaced with different BPLs 405 that have a link quality that satisfies the threshold. Such techniques may enable improved communications by updating at least one BPL 405 that may be affected by interference. Further, the described techniques may be performed dynamically as the communications environment between the UE 115 and TRP changes, allowing multiple updates to the BPLs 405 and the communication time period 401 used by the TRP and UE 115.

In some examples, the TRP may signal a request for the UE 115 to perform one or more measurements of BPLs 405 during the portion 410 having the degraded link quality (e.g., to identify candidate BPLs 405 that have a link quality that satisfies the threshold). In some examples, the UE 115 may pause its operation to perform the measurements, or may continue operating while performing the measurements. The UE 115 may report the measurements to the TRP, and the TRP may signal a configuration that indicates an updated local communication time period to replace, for example, BPLs 405 and corresponding times within the portion 410. In some cases, the configuration may be signaled using semi-static signaling, such as RRC messaging or a MAC control element (MAC-CE). The BPLs 405 and corresponding times may be replaced with the other BPLs 405 and their corresponding times based on the measurement report. The UE 115 and TRP may then resume operation using the updated communication time period 402 that includes the replaced BPLs 405. In some cases, after an updated configuration of the communication time period 401 is signaled to the UE 115, the TRP may signal the UE 115 to resume operation by starting from the beginning of the communication time period 402, or resume at a particular point of the communication time period 402 (e.g., at a particular time in the middle of the communication time period 402).

In some examples, instead of updating the one or more BPLs 405 having a decreased link quality within the portion 410 of the communication time period 401, the TRP may update the entire communication time period 401. For example, the TRP may provide, to the UE 115, an updated communication time period 401 that skips the portion 410 that includes the BPLs 405 with degraded link quality. As such, the portion 410 between T1 and T2 of the communication time period 401 may be removed. Additionally or alternatively, corresponding UE 115 movements associated with the removed time period may also be excluded.

Figure 5:
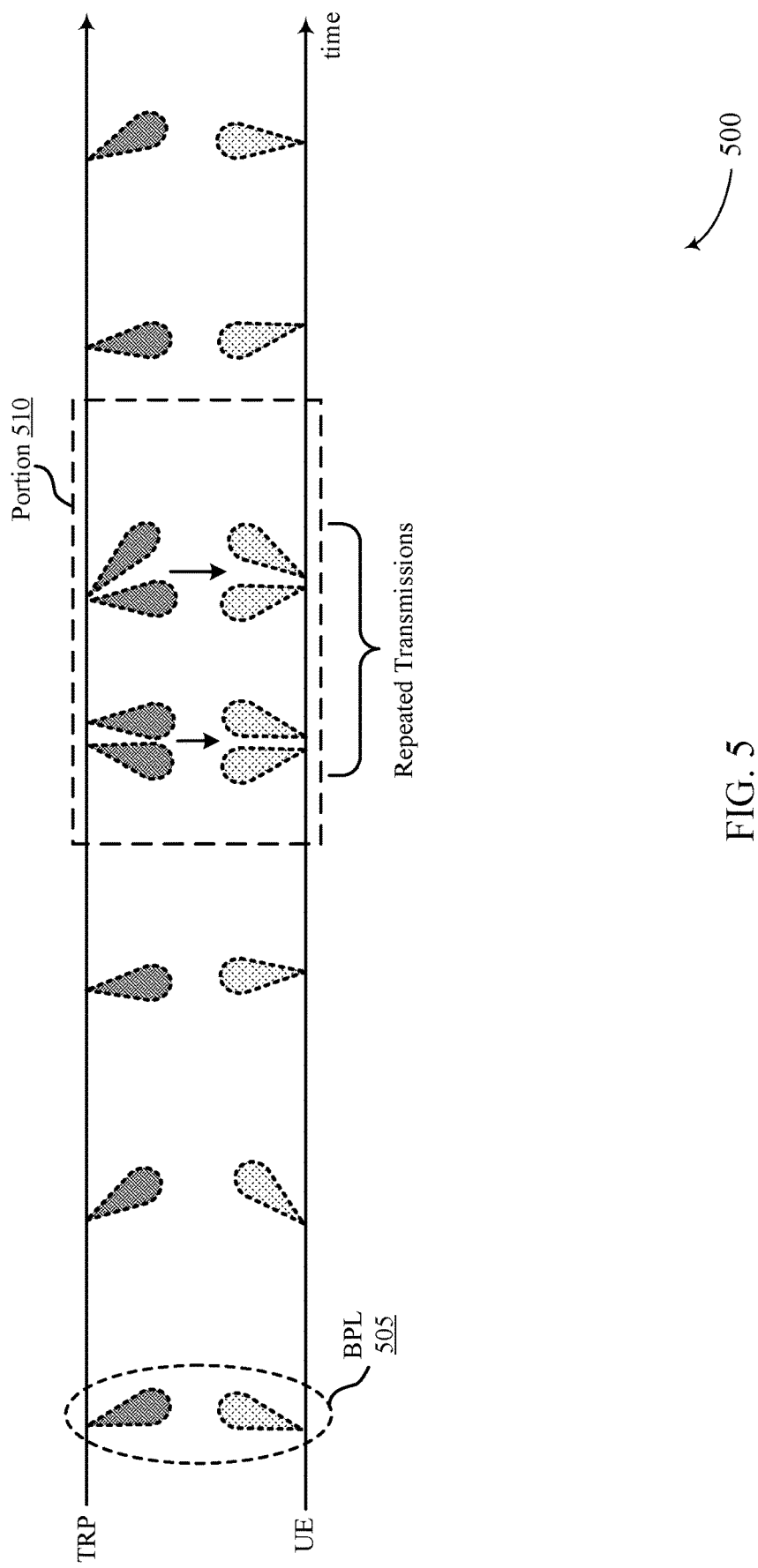
FIG. 5 illustrates an example of a communication time period that supports adaptation of predetermined beam switching in accordance with aspects of the present disclosure.

FIG. 5 illustrates an example of a communication time period 500 that supports adaptation of predetermined beam switching in accordance with aspects of the present disclosure. In some examples, communication time period 401 and communication time period 402 may be used for communications between one or more wireless devices, such as a UE 115, a base station 105, a TRP, or other wireless devices (such as a controlling wireless device and/or a secondary wireless device), as described with reference to FIGS. 1 and 2. The communication time period 500 may illustrate the use of repeated transmissions in response to identifying at least one BPL having a link quality that does not satisfy a threshold.

As described herein, a communication time period 500 may be based on a set of predetermined movements by a UE 115. Further, respective BPLs 505 may be affected by degraded link quality after a set of BPLs 505 are configured for the UE's movements. That is, BPLs 505 within a portion 510 of the communication time period 500 may have decreased link quality (e.g., as compared to prior measurements or as compared to other BPLs 505) due to interference. In such cases, the UE 115 and TRP may use communications techniques that enable repeated transmissions during the portion 510 of the communication time period 500 experiencing decreased link quality.

For example, when signaling a configuration for the portion of the communication time period, a TRP may signal that a UE 115 may transmit and receive repetitions of a packet during the portion 510 determined to have degraded link quality. The repeated transmissions may include sending repetitions of the packet with a same BPL 505, or with different BPLs 505. Additionally or alternatively, a same packet may be simultaneously transmitted and received using multiple BPLs 505. For instance, the packet may be transmitted by multiple TRPs and received by beams on respective panels (e.g., antenna arrays) of the UE 115. In other cases, a TRP may use multiple BPLs to simultaneously transmit a repeated packet to the UE 115, and the UE 115 may likewise receive the packet using multiple panels (and multiple BPLs 505). In some examples, the repeated transmissions may be transmitted to or received from different wireless devices. For instance, the UE 115 may be signaled to transmit repeated transmissions to multiple TRPs (e.g., using respective BPLs for each TRP) to ensure transmitted packet is received. The use of the repeated transmissions may enable robust communications during the portion 510 of the communication time period 500 that may be affected by interference.

Figure 6:
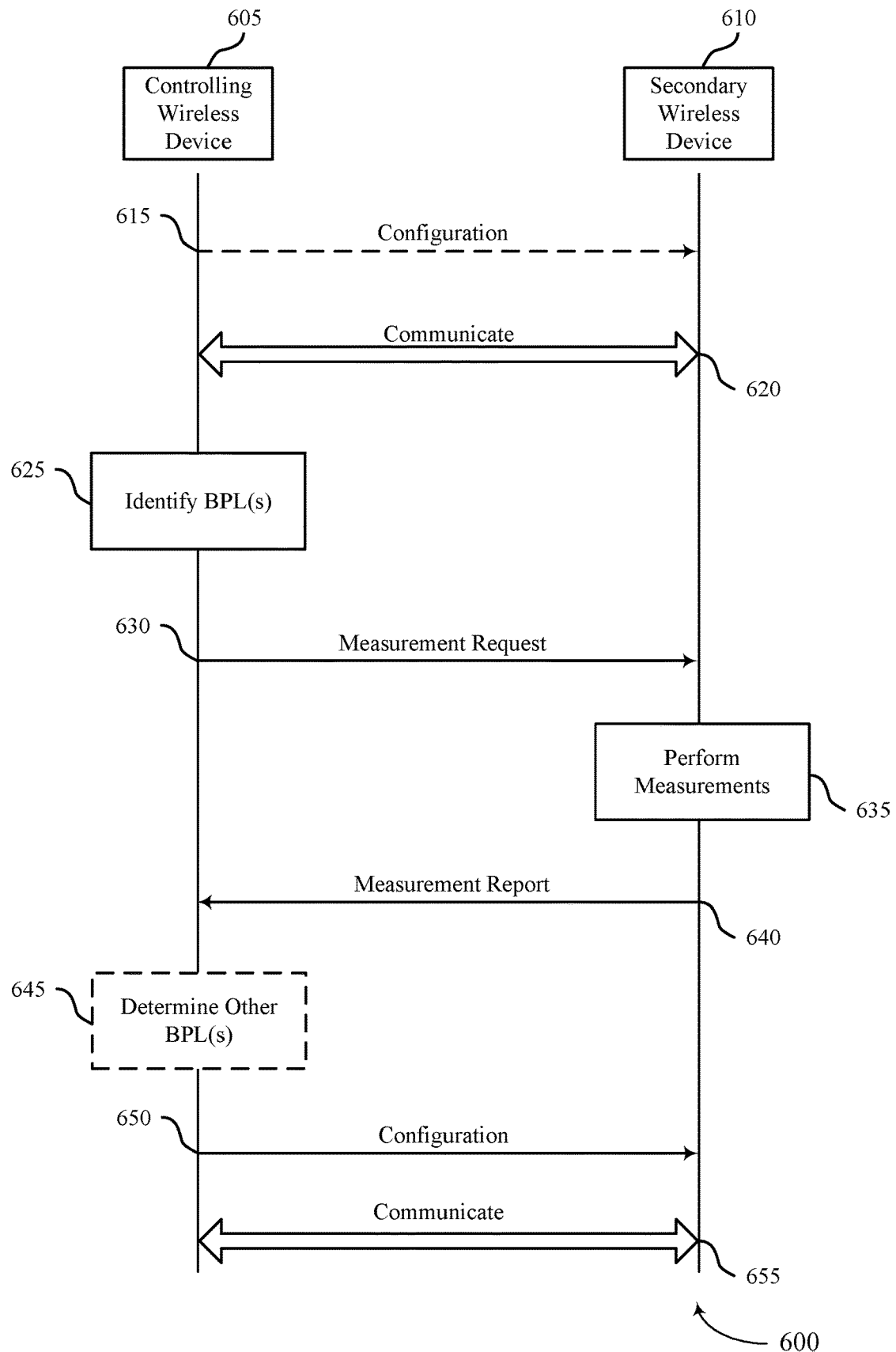
FIG. 6 illustrates an example of a process flow that supports adaptation of predetermined beam switching in accordance with aspects of the present disclosure.

FIG. 6 illustrates an example of a process flow 600 that supports adaptation of predetermined beam switching in accordance with aspects of the present disclosure. In some examples, process flow 600 may implement aspects of wireless communications system 100. For instance, process flow includes a controlling wireless device 605, which may be an example of a base station 105, a TRP, or a UE 115, as described with reference to FIGS. 1 and 2. Additionally, process flow 600 includes a secondary wireless device 610, which may be an example of a UE 115 or another device that is controlled by, for example, a controlling wireless device 605. Process flow 600 may illustrate the use of modified communications schemes through the adjustment of BPLs used by each device in the presence of interference.

At 615, the controlling wireless device 605 may transmit, and the secondary wireless device 610 may receive, a configuration of a communication time period. The communication time period may include a set of BPLs that are used to transmit and receive data at respective times of the communication time period. In some cases, the configuration may be signaled using RRC signaling, using a MAC-CE, or other types of signaling supported by the wireless devices. In some cases, the configuration may be based on a previously-completed beam training (and measurements) for a series of predetermined movements by the secondary wireless device 610.

At 620, the controlling wireless device 605 and the secondary wireless device 610 may communicate by cycling through a set of BPLs at respective times within a communication time period. In such cases, each BPL of the set of BPLs may correspond to different locations of the secondary wireless device 610 as it progresses through predetermined movements.

At 625, the controlling wireless device 605 may identify, for a portion of the communication time period, at least one BPL of the set of BPLs having a link quality that does not satisfy a threshold. As an example, the controlling wireless device 605 may detect that a link quality for a BPL has decreased from a previously recorded value (e.g., by a certain quantity). In other cases, the controlling wireless device 605 may identify a number of retransmissions requested by the secondary wireless device 610 (e.g., using HARQ feedback) for the BPL having decreased link quality. In any event, the link quality of at least one BPL may trigger the controlling wireless device 605 to enable techniques that update BPLs for communication with the secondary wireless device 610.

At 630, the controlling wireless device 605 may transmit, and the secondary wireless device 610 may receive, a signal requesting the secondary wireless device perform measurements for the portion of the communication time period. As such, at 635, the secondary wireless device 610 may perform a set of measurements for BPLs for the identified portion of the communication time period. In such cases, the secondary wireless device 610 may identify a best BPL (e.g., a BPL having a highest signal quality with relation to other possible BPLs). At 640, the secondary wireless device 610 may transmit a measurement report to the controlling wireless device 605. In some cases, the measurement report may include an indication of the BPL identified by the secondary wireless device 610.

At 645, the controlling wireless device 605 may determine, based on the at least one BPL having the link quality that does not satisfy the threshold, at least one other BPL having a link quality that satisfies the threshold during the portion of the communication time period. In some cases, the at least one other BPL and the other corresponding time may be based on the received measurement report.

At 650, the controlling wireless device 605 may transmit, and the secondary wireless device 610 may receive, a configuration that modifies communications with the secondary wireless device 610 during the portion of the communication time period. In some examples, the configuration that modifies the communications with the secondary wireless device 610 replaces the at least one BPL and a corresponding time with the at least one other BPL and another corresponding time for the portion of the communication time period. In such cases, at 655, the controlling wireless device 605 and the secondary wireless device 610 may communicate during a subsequent instance of the communication time period by cycling through the set of BPLs, including the at least one other BPL and the other corresponding time, and excluding the at least one BPL based at least in part on the configuration.

Additionally or alternatively, the configuration that modifies the communications with the secondary wireless device 610 may enable repeated transmissions by the devices. In such cases, the controlling wireless device 605 may determine, based on the at least one BPL having the link quality that does not satisfy the threshold, to utilize repeated transmissions during the portion of the communication time period. Accordingly, the controlling wireless device 605 may determine at least one of a number of repeated transmissions, a corresponding BPL for each of the repeated transmissions, or corresponding BPLs for simultaneous transmissions, where the repeated transmissions may include repetitions of a packet using a same BPL, or repetitions of the packet using two or more different BPLs, or simultaneous repetitions of a packet using two or more BPLs, or a combination thereof.

In other examples, the configuration that modifies the communications with the secondary wireless device 610 includes an adjusted communication time period that excludes the portion of the communication time period. That is, at 655, the controlling wireless device 605 and the secondary wireless device 610 may communicate during a subsequent communication time period without portion (and corresponding the BPLs) of the communication time period. In some cases, the communications at 655 may be triggered by a signal from the controlling wireless device 605, or may be resumed autonomously. In some examples, the operations of process flow 600 may be performed repeatedly, where the controlling wireless device 605 may continually monitor for BPLs having a decreased link quality, and update the BPLs used for communications through any of the described techniques.

Figure 7:
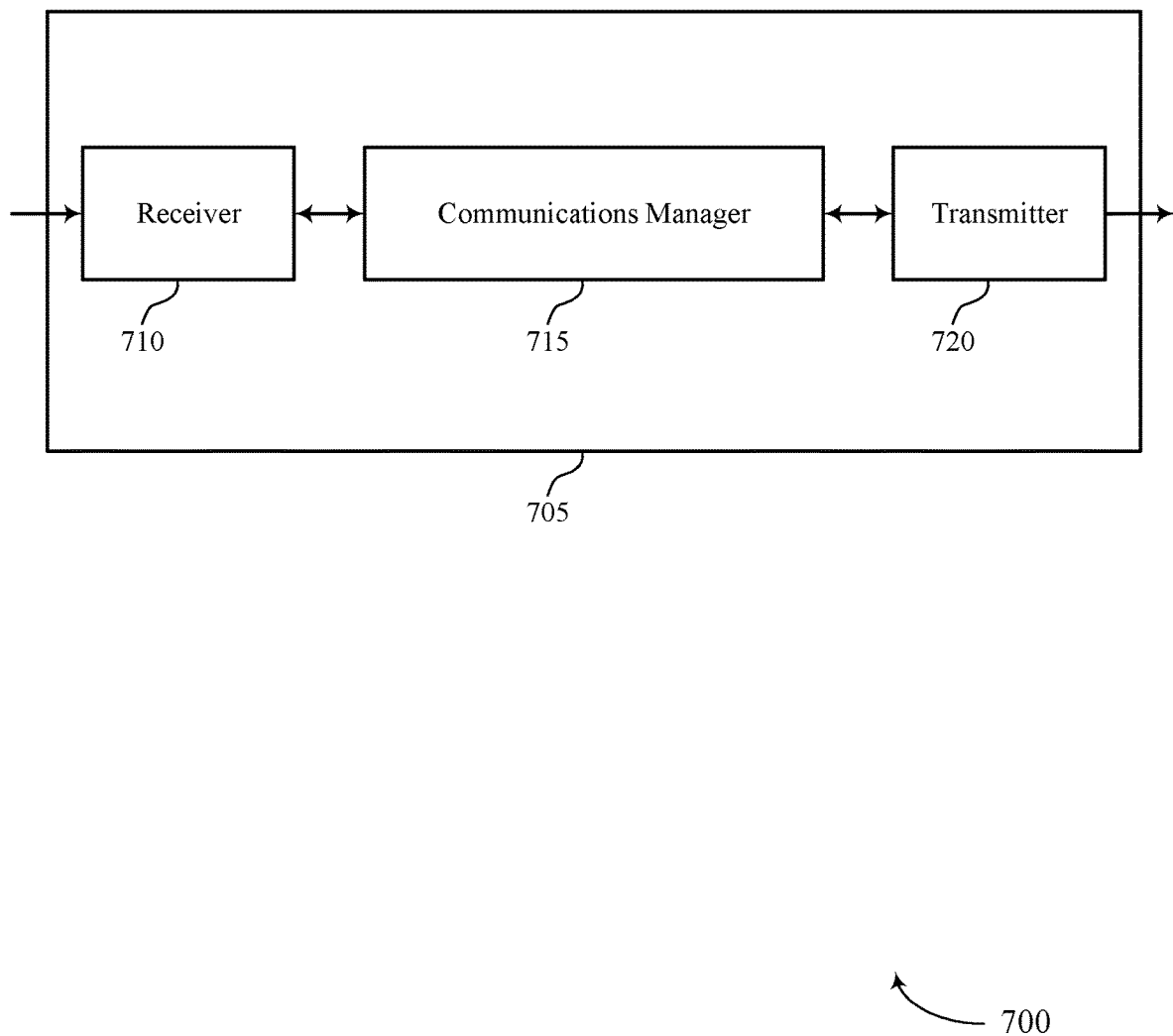
FIGS. 7 and 8 show block diagrams of devices that support adaptation of predetermined beam switching in accordance with aspects of the present disclosure.

FIG. 7 shows a block diagram 700 of a device 705 that supports adaptation of predetermined beam switching in accordance with aspects of the present disclosure. The device 705 may be an example of aspects of a UE 115, base station 105, controlling wireless device, secondary wireless device, or TRP as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to adaptation of predetermined beam switching, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may communicate with a secondary wireless device by cycling through a set of BPLs at respective times within a communication time period, identify, for a portion of the communication time period, at least one BPL of the set of BPLs having a link quality that does not satisfy a threshold, and transmit, to the secondary wireless device, a configuration that modifies communications with the secondary wireless device during the portion of the communication time period. The communications manager 715 may also communicate with a controlling wireless device by cycling through a set of BPLs at respective times within a communication time period and receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

In some examples, the UE communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow device 705 to determine link quality of a BPL to a base station, and in some cases, establish a new BPL. The new BPL may increase the communication efficiency between device 705 and the base station, which may promote network efficiencies, among other benefits.

Figure 8:
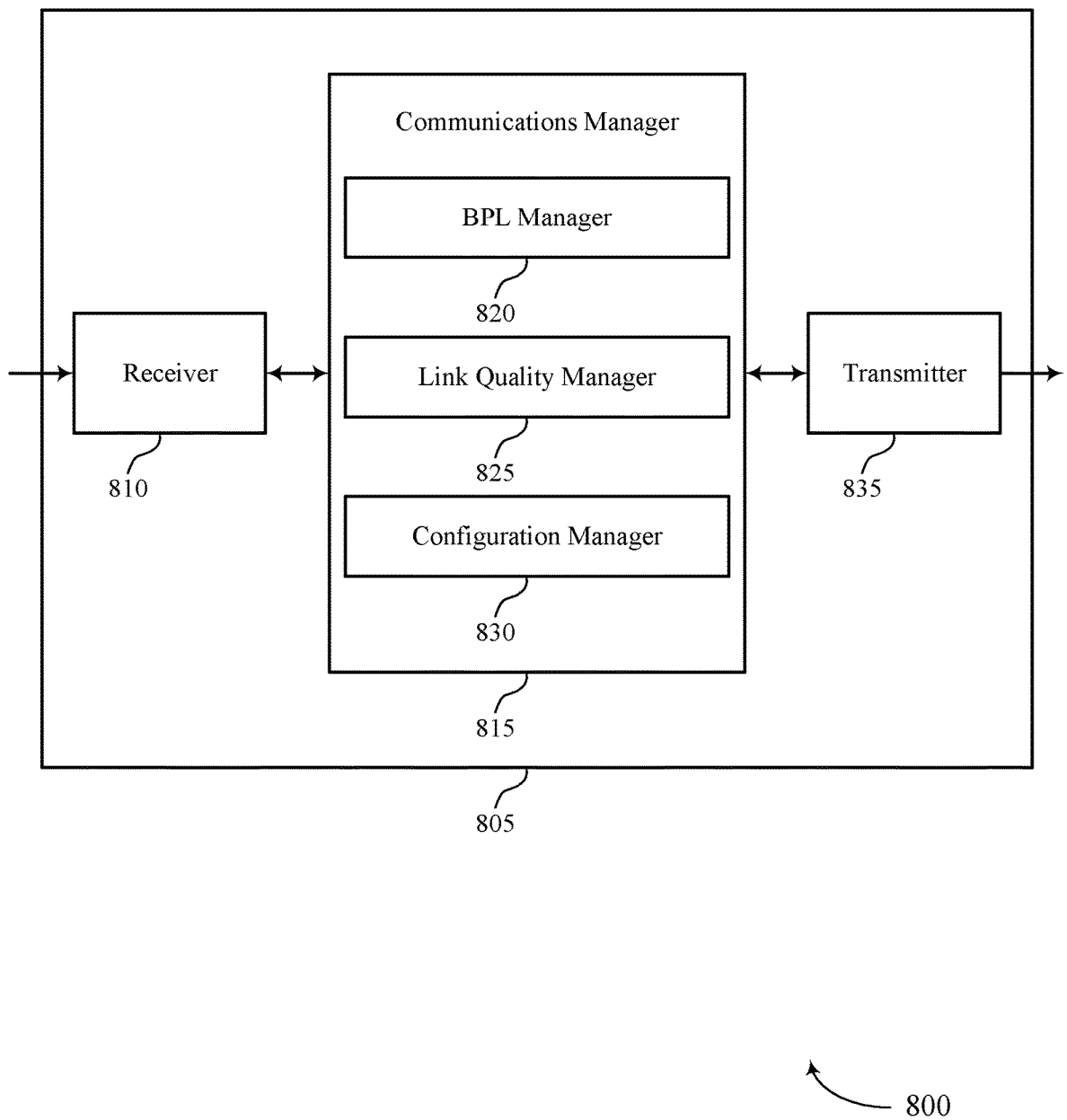

FIG. 8 shows a block diagram 800 of a device 805 that supports adaptation of predetermined beam switching in accordance with aspects of the present disclosure. The device 805 may be an example of aspects of a device 705, a UE 115, a base station 105, a controlling wireless device, a secondary wireless device, or a TRP as described herein. The device 805 may include a receiver 810, a communications manager 815, and a transmitter 835. The device 805 may also include a processor. Each of these components may be in communication with one another (e.g., via one or more buses).

Receiver 810 may receive information such as packets, user data, or control information associated with various information channels (e.g., control channels, data channels, and information related to adaptation of predetermined beam switching, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a BPL manager 820, a link quality manager 825, and a configuration manager 830. The communications manager 815 may be an example of aspects of the communications manager 1010 or 1110 as described herein.

The BPL manager 820 may communicate with a secondary wireless device by cycling through a set of BPLs at respective times within a communication time period. Additionally or alternatively, the BPL manager 820 may communicate with a controlling wireless device by cycling through the set of BPLs at the respective times within the communication time period. The link quality manager 825 may identify, for a portion of the communication time period, at least one BPL of the set of BPLs having a link quality that does not satisfy a threshold.

The configuration manager 830 may transmit, to a secondary wireless device, a configuration that modifies communications with the secondary wireless device during the portion of the communication time period. Additionally or alternatively, the configuration manager 830 may receive, from a controlling wireless device, a configuration that modifies communications with the controlling wireless device during a portion of the communication time period, where the configuration is received based on at least one BPL of the set of BPLs having a link quality that does not satisfy a threshold during the portion of the communication time period.

Transmitter 835 may transmit signals generated by other components of the device 805. In some examples, the transmitter 835 may be collocated with a receiver 810 in a transceiver module. For example, the transmitter 835 may be an example of aspects of the transceiver 1020 or 1120 as described with reference to FIGS. 10 and 11. The transmitter 835 may utilize a single antenna or a set of antennas.

Figure 9:
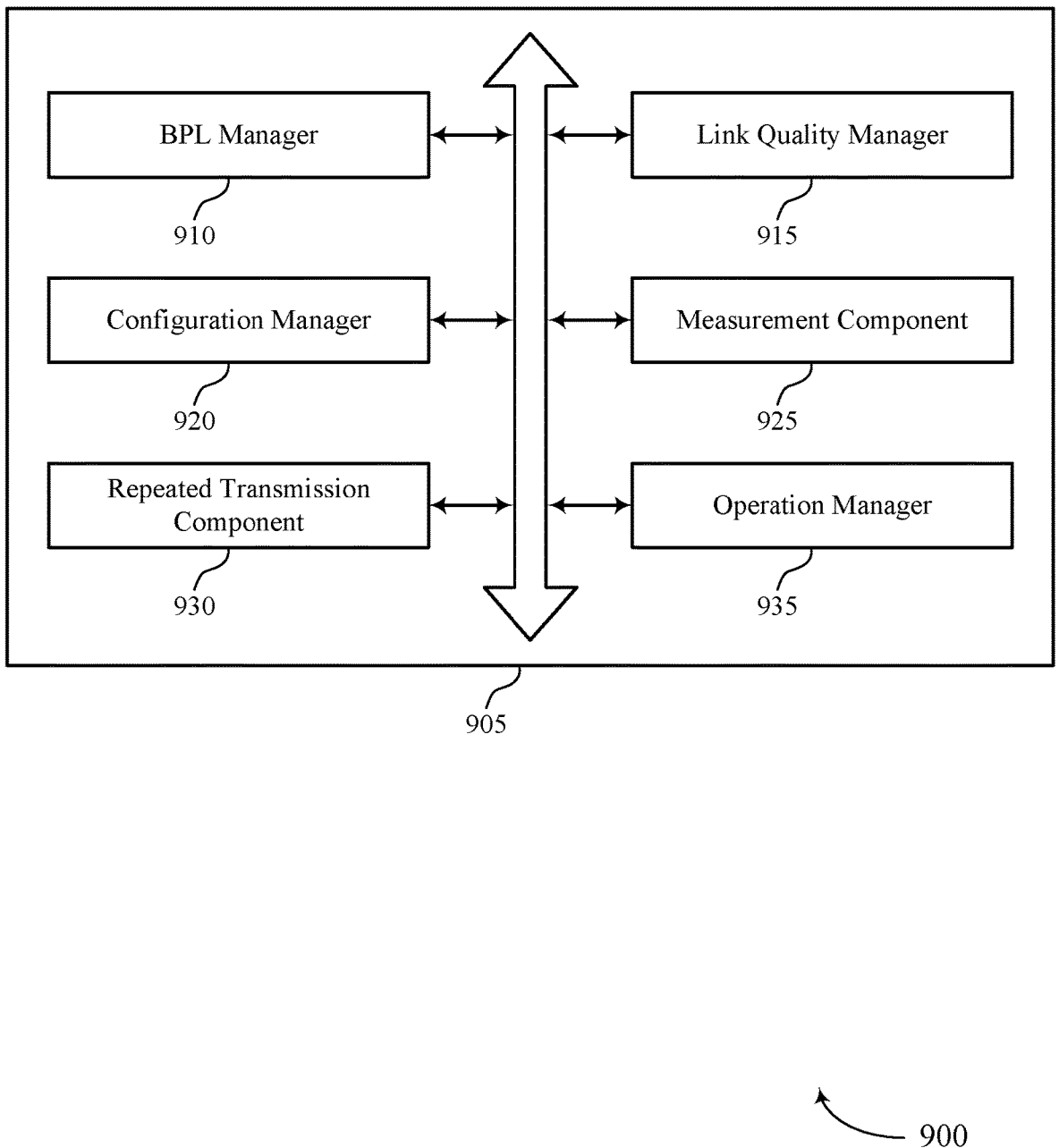
FIG. 9 shows a block diagram of a communications manager that supports adaptation of predetermined beam switching in accordance with aspects of the present disclosure.

FIG. 9 shows a block diagram 900 of a communications manager 905 that supports adaptation of predetermined beam switching in accordance with aspects of the present disclosure. The communications manager 905 may be an example of aspects of a communications manager 715, a communications manager 815, or a communications manager 1010 described herein. The communications manager 905 may include a BPL manager 910, a link quality manager 915, a configuration manager 920, a measurement component 925, a repeated transmission component 930, and an operation manager 935. Each of these modules may communicate, directly or indirectly, with one another (e.g., via one or more buses).

The BPL manager 910 may communicate with a secondary wireless device by cycling through a set of BPLs at respective times within a communication time period. In some examples, the BPL manager 910 may communicate with a controlling wireless device by cycling through the set of BPLs at respective times within a communication time period. In some examples, the BPL manager 910 may determine, based on the at least one BPL having the link quality that does not satisfy the threshold, at least one other BPL having a link quality that satisfies the threshold during the portion of the communication time period.

In some examples, the BPL manager 910 may communicate with the secondary wireless device during a subsequent instance of the communication time period by cycling through the set of BPLs, including the at least one other BPL and the other corresponding time, and excluding the at least one BPL based on the configuration. In some examples, the BPL manager 910 may communicate with the controlling wireless device by cycling through the set of BPLs including the at least one other BPL and the other corresponding time and excluding the at least one BPL during a subsequent instance of the communication time period based on the configuration. In some cases, the set of BPLs may be pre-determined based on at least one of a position of the secondary wireless device or an orientation of the secondary wireless device.

The link quality manager 915 may identify, for a portion of the communication time period, at least one BPL of the set of BPLs having a link quality that does not satisfy a threshold. The configuration manager 920 may transmit, to the secondary wireless device, a configuration that modifies communications with the secondary wireless device during the portion of the communication time period. In some examples, the configuration manager 920 may receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

In some examples, the configuration that modifies the communications with the secondary wireless device may replace the at least one BPL and a corresponding time with the at least one other BPL and another corresponding time for the portion of the communication time period. In some examples, the configuration that modifies the communications with the secondary wireless device may include an indication of at least one of the number of repeated transmissions, the corresponding BPLs for each of the repeated transmissions, or the corresponding BPLs for the simultaneous transmissions.

In some cases, the configuration that modifies the communications with the secondary wireless device includes an adjusted communication time period that excludes the portion of the communication time period. In some cases, the configuration that modifies the communications with the secondary wireless device replaces the at least one BPL and a corresponding time with the at least one other BPL and another corresponding time for the portion of the communication time period, the at least one other BPL having a link quality that satisfies the threshold based on the set of measurements.

In some cases, the configuration that modifies the communications with the controlling wireless device enables repeated transmissions during the portion of the communication time period. Additionally or alternatively, the configuration that modifies the communications with the controlling wireless device includes an adjusted communication time period that excludes the portion of the communication time period.

The measurement component 925 may transmit a signal requesting the secondary wireless device perform measurements for the portion of the communication time period. In some examples, the measurement component 925 may receive, from the secondary wireless device and in response to the signal, a measurement report for the portion of the communication time period, where the at least one other BPL and the other corresponding time is based on the received measurement report. In some examples, the measurement component 925 may receive a signal requesting the secondary wireless device perform measurements for the portion of the communication time period.

In some examples, the measurement component 925 may perform a set of measurements for at least one other BPL during the portion of the communication time period. In some examples, the measurement component 925 may transmit, to the controlling wireless device and in response to the signal, a measurement report for the portion of the communication time period.

The repeated transmission component 930 may determine, based on the at least one BPL having the link quality that does not satisfy the threshold, to utilize repeated transmissions during the portion of the communication time period, where the configuration that modifies the communications with the secondary wireless device enables the repeated transmissions. In some examples, the repeated transmission component 930 may determine at least one of a number of repeated transmissions, a corresponding BPL for each of the repeated transmissions, or corresponding BPLs for simultaneous transmissions.

In some cases, the repeated transmissions include at least one of repetitions of a packet using a same BPL or repetitions of the packet using two or more different BPLs. In some cases, the repeated transmissions include simultaneous repetitions of a packet using two or more BPLs. In some examples, the repeated transmissions include at least one of repetitions of a packet using a same BPL or repetitions of the packet using two or more different BPLs. In some cases, the repeated transmissions include simultaneous transmissions of a packet using two or more BPLs. In some cases, the configuration that modifies the communications with the controlling wireless device includes an indication of at least one of a number of repeated transmissions, a corresponding BPL for each repeated transmission, or corresponding BPLs for simultaneous transmissions.

The operation manager 935 may transmit, to the secondary wireless device, an indication to resume operation in accordance with the communication time period, where the operation is resumed from at least one of a beginning of the communication time period or a designated time of the communication time period. In some examples, the operation manager 935 may pause operations of the secondary wireless device while performing the set of measurements. In some examples, the operation manager 935 may receive, from the controlling wireless device, an indication to resume operation in accordance with the communication time period, where the operation is resumed from at least one of a beginning of the communication time period or a designated time of the communication time period.

Figure 10:
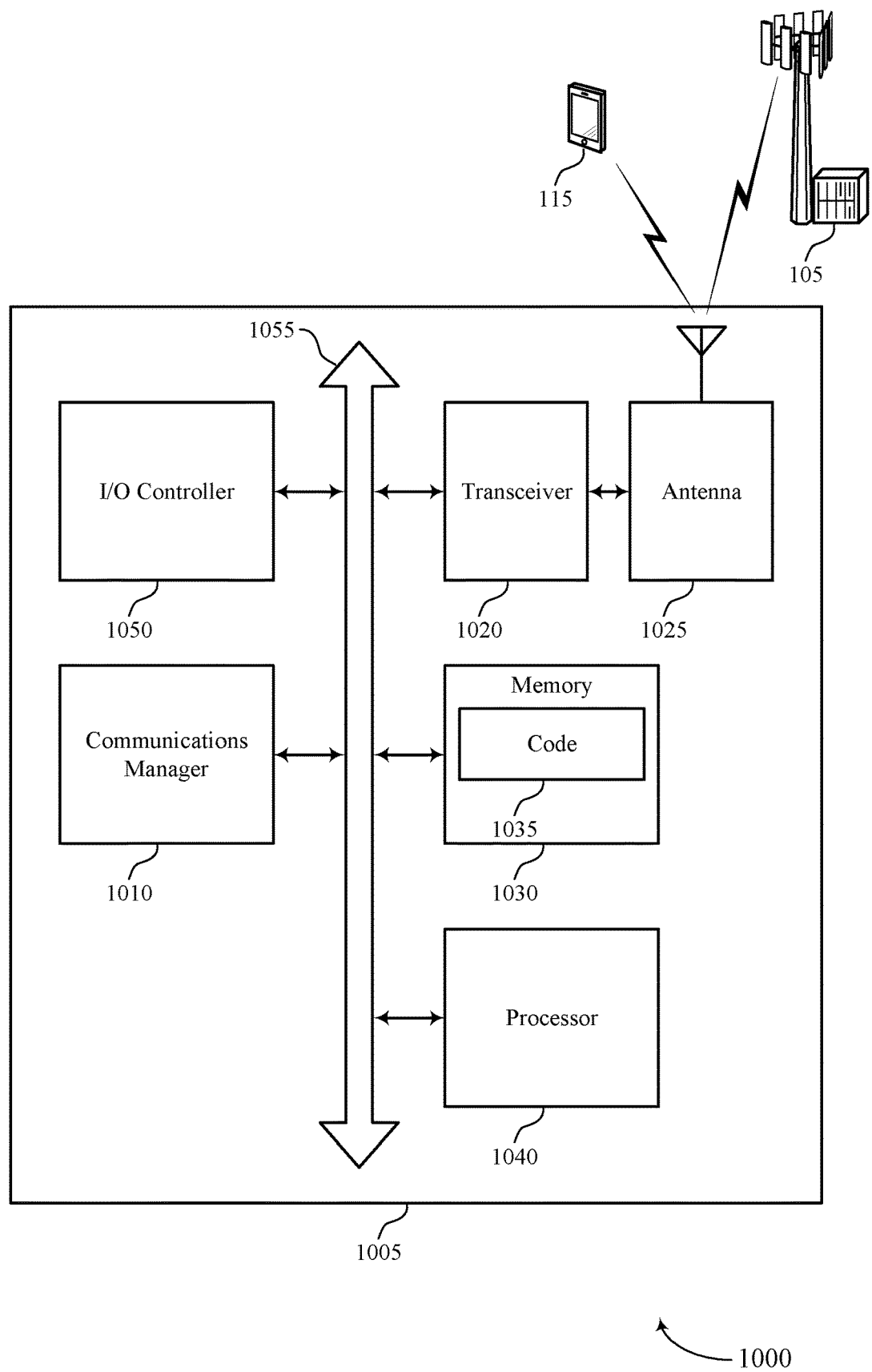
FIG. 10 shows a diagram of a system including a user equipment (UE) that supports adaptation of predetermined beam switching in accordance with aspects of the present disclosure.

FIG. 10 shows a diagram of a system 1000 including a device 1005 that supports adaptation of predetermined beam switching in accordance with aspects of the present disclosure. The device 1005 may be an example of or include the components of device 705, device 805, or a secondary wireless device, or a controlling wireless device, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may communicate with a secondary wireless device by cycling through a set of BPLs at respective times within a communication time period, identify, for a portion of the communication time period, at least one BPL of the set of BPLs having a link quality that does not satisfy a threshold, and transmit, to the secondary wireless device, a configuration that modifies communications with the secondary wireless device during the portion of the communication time period. The communications manager 1010 may also communicate with a controlling wireless device by cycling through a set of BPLs at respective times within a communication time period and receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include random access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptation of predetermined beam switching).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
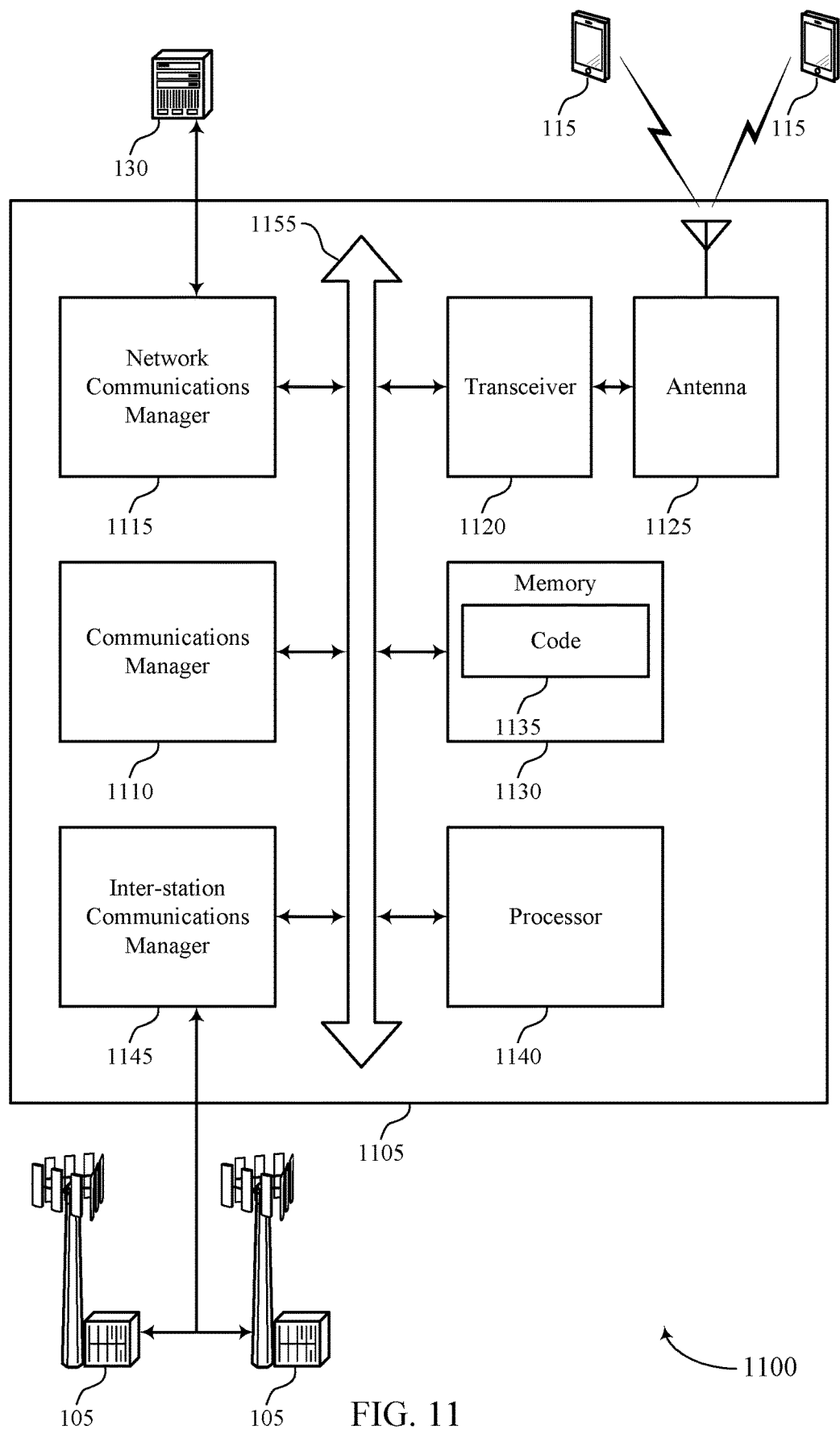
FIG. 11 shows a diagram of a system including a base station that supports adaptation of predetermined beam switching in accordance with aspects of the present disclosure.

FIG. 11 shows a diagram of a system 1100 including a device 1105 that supports adaptation of predetermined beam switching in accordance with aspects of the present disclosure. The device 1105 may be an example of or include the components of device 705, device 805, or a controlling wireless device, or a secondary wireless device, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may communicate with a secondary wireless device by cycling through a set of BPLs at respective times within a communication time period, identify, for a portion of the communication time period, at least one BPL of the set of BPLs having a link quality that does not satisfy a threshold, and transmit, to the secondary wireless device, a configuration that modifies communications with the secondary wireless device during the portion of the communication time period. The communications manager 1110 may also communicate with a controlling wireless device by cycling through a set of BPLs at respective times within a communication time period and receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting adaptation of predetermined beam switching).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
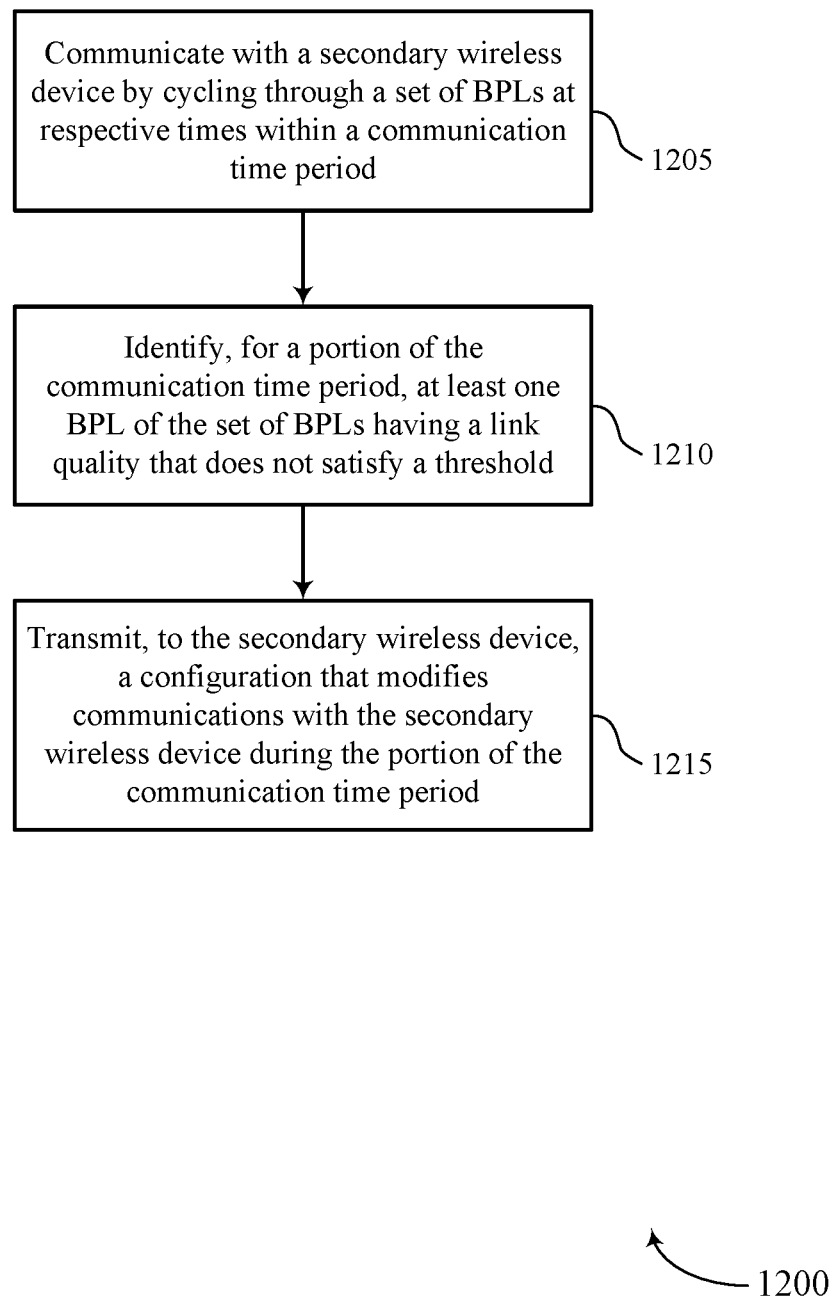
FIGS. 12 and 13 show flowcharts illustrating methods that support adaptation of predetermined beam switching in accordance with aspects of the present disclosure.

FIG. 12 shows a flowchart illustrating a method 1200 that supports adaptation of predetermined beam switching in accordance with aspects of the present disclosure. The operations of method 1200 may be implemented by a controlling wireless device (such as a UE 115, TRP, or base station 105) or its components as described herein. For example, the operations of method 1200 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the controlling wireless device may communicate with a secondary wireless device by cycling through a set of BPLs at respective times within a communication time period. The operations of 1205 may be performed according to the methods described herein. In some examples, aspects of the operations of 1205 may be performed by a BPL manager as described with reference to FIGS. 7 through 11.

At 1210, the controlling wireless device may identify, for a portion of the communication time period, at least one BPL of the set of BPLs having a link quality that does not satisfy a threshold. The operations of 1210 may be performed according to the methods described herein. In some examples, aspects of the operations of 1210 may be performed by a link quality manager as described with reference to FIGS. 7 through 11.

At 1215, the controlling wireless device may transmit, to the secondary wireless device, a configuration that modifies communications with the secondary wireless device during the portion of the communication time period. The operations of 1215 may be performed according to the methods described herein. In some examples, aspects of the operations of 1215 may be performed by a configuration manager as described with reference to FIGS. 7 through 11.

Figure 13:
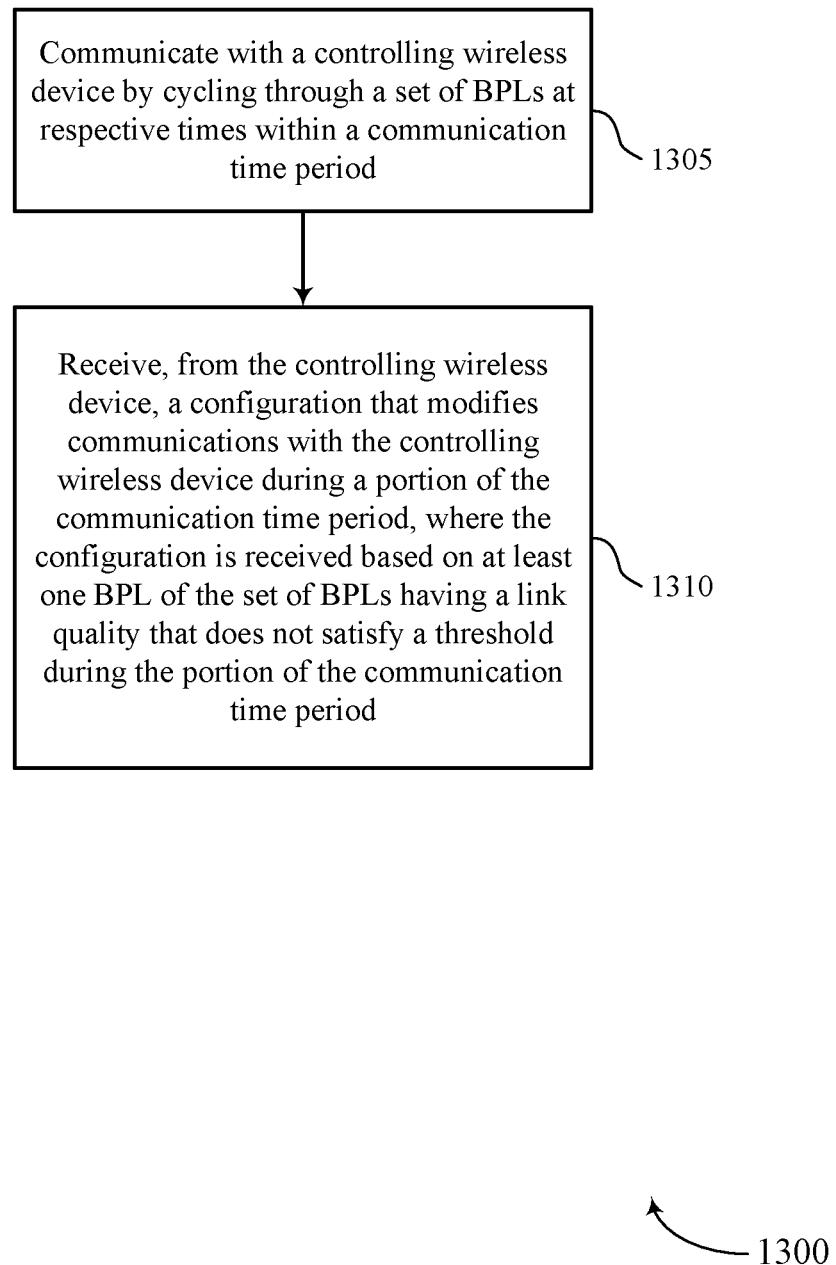

FIG. 13 shows a flowchart illustrating a method 1300 that supports adaptation of predetermined beam switching in accordance with aspects of the present disclosure. The operations of method 1300 may be implemented by a secondary wireless device (such as a UE 115 or base station 105) or its components as described herein. For example, the operations of method 1300 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the secondary wireless device may communicate with a controlling wireless device by cycling through a set of BPLs at respective times within a communication time period. The operations of 1305 may be performed according to the methods described herein. In some examples, aspects of the operations of 1305 may be performed by a BPL manager as described with reference to FIGS. 7 through 11.

At 1310, the secondary wireless device may receive, from the controlling wireless device, a configuration that modifies communications with the controlling wireless device during a portion of the communication time period, where the configuration is received based on at least one BPL of the set of BPLs having a link quality that does not satisfy a threshold during the portion of the communication time period. The operations of 1310 may be performed according to the methods described herein. In some examples, aspects of the operations of 1310 may be performed by a configuration manager as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal FDMA (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a secondary wireless device, comprising:
   a processor;
   memory coupled with the processor; and
   instructions stored in the memory and executable by the processor to cause the apparatus to:

communicate with a controlling wireless device by cycling through a plurality of beam pair links (BPLs) at respective times within a communication time period; and receive, from the controlling wireless device, a configuration that modifies communications with the controlling wireless device during a portion of the communication time period, wherein the configuration is received based at least in part on at least one BPL of the plurality of BPLs having a link quality that does not satisfy a threshold during the portion of the communication time period.

2. The apparatus of claim 1, wherein the instructions are further executable by the processor to cause the apparatus to:

receive a signal requesting the secondary wireless device perform measurements for the portion of the communication time period;

perform a set of measurements for at least one other BPL during the portion of the communication time period; and transmit, to the controlling wireless device and in response to the signal, a measurement report for the portion of the communication time period.

3. The apparatus of claim 2, wherein the configuration that modifies the communications with the secondary wireless device replaces the at least one BPL and a corresponding time with the at least one other BPL and another corresponding time for the portion of the communication time period, the at least one other BPL having a link quality that satisfies the threshold based at least in part on the set of measurements.

4. The apparatus of claim 3, wherein the instructions are further executable by the processor to cause the apparatus to:

communicate with the controlling wireless device by cycling through the plurality of BPLs including the at least one other BPL and the other corresponding time and excluding the at least one BPL during a subsequent instance of the communication time period based at least in part on the configuration.

5. The apparatus of claim 2, wherein the instructions are further executable by the processor to cause the apparatus to:

pause operations of the secondary wireless device while performing the set of measurements.

6. The apparatus of claim 1, wherein the configuration that modifies the communications with the controlling wireless device enables repeated transmissions during the portion of the communication time period.

7. The apparatus of claim 6, wherein the repeated transmissions comprise at least one of repetitions of a packet using a same BPL or repetitions of the packet using two or more different BPLs.

8. The apparatus of claim 6, wherein the repeated transmissions comprise simultaneous transmissions of a packet using two or more BPLs.

9. The apparatus of claim 6, wherein the configuration that modifies the communications with the controlling wireless device comprises an indication of at least one of a number of repeated transmissions, a corresponding BPL for each repeated transmission, or corresponding BPLs for simultaneous transmissions.

10. The apparatus of claim 1, wherein the configuration that modifies the communications with the controlling wireless device comprises an adjusted communication time period that excludes the portion of the communication time period.

11. The apparatus of claim 1, wherein the instructions are further executable by the processor to cause the apparatus to:

receive, from the controlling wireless device, an indication to resume operation in accordance with the communication time period, wherein the operation is resumed from at least one of a beginning of the communication time period or a designated time of the communication time period.

12. A method for wireless communications at a secondary wireless device, comprising:

communicating with a controlling wireless device by cycling through a plurality of beam pair links (BPLs) at respective times within a communication time period; and receiving, from the controlling wireless device, a configuration that modifies communications with the controlling wireless device during a portion of the communication time period, wherein the configuration is received based at least in part on at least one BPL of the plurality of BPLs having a link quality that does not satisfy a threshold during the portion of the communication time period.

13. The method of claim 12, further comprising:

receiving a signal requesting the secondary wireless device perform measurements for the portion of the communication time period;

performing a set of measurements for at least one other BPL during the portion of the communication time period; and transmitting, to the controlling wireless device and in response to the signal, a measurement report for the portion of the communication time period.

14. The method of claim 13, wherein the configuration that modifies the communications with the secondary wireless device replaces the at least one BPL and a corresponding time with the at least one other BPL and another corresponding time for the portion of the communication time period, the at least one other BPL having a link quality that satisfies the threshold based at least in part on the set of measurements.

15. The method of claim 14, further comprising:

communicating with the controlling wireless device by cycling through the plurality of BPLs including the at least one other BPL and the other corresponding time and excluding the at least one BPL during a subsequent instance of the communication time period based at least in part on the configuration.

16. The method of claim 13, further comprising:

pausing operations of the secondary wireless device while performing the set of measurements.

17. The method of claim 12, wherein the configuration that modifies the communications with the controlling wireless device enables repeated transmissions during the portion of the communication time period.

18. The method of claim 17, wherein the repeated transmissions comprise at least one of repetitions of a packet using a same BPL or repetitions of the packet using two or more different BPLs.

19. The method of claim 17, wherein the repeated transmissions comprise simultaneous transmissions of a packet using two or more BPLs.

20. The method of claim 17, wherein the configuration that modifies the communications with the controlling wireless device comprises an indication of at least one of a number of repeated transmissions, a corresponding BPL for each repeated transmission, or corresponding BPLs for simultaneous transmissions.

21. The method of claim 12, wherein the configuration that modifies the communications with the controlling wireless device comprises an adjusted communication time period that excludes the portion of the communication time period.

22. The method of claim 12, further comprising:
receiving, from the controlling wireless device, an indication to resume operation in accordance with the communication time period, wherein the operation is resumed from at least one of a beginning of the communication time period or a designated time of the communication time period.

23. An apparatus for wireless communications at a secondary wireless device, comprising:
means for communicating with a controlling wireless device by cycling through a plurality of beam pair links (BPLs) at respective times within a communication time period; and
means for receiving, from the controlling wireless device, a configuration that modifies communications with the controlling wireless device during a portion of the communication time period, wherein the configuration is received based at least in part on at least one BPL of the plurality of BPLs having a link quality that does not satisfy a threshold during the portion of the communication time period.

24. The apparatus of claim 23, further comprising:
means for receiving a signal requesting the secondary wireless device perform measurements for the portion of the communication time period;
means for performing a set of measurements for at least one other BPL during the portion of the communication time period; and
means for transmitting, to the controlling wireless device and in response to the signal, a measurement report for the portion of the communication time period.

25. The apparatus of claim 24, wherein the configuration that modifies the communications with the secondary wireless device replaces the at least one BPL and a corresponding time with the at least one other BPL and another corresponding time for the portion of the communication time period, the at least one other BPL having a link quality that satisfies the threshold based at least in part on the set of measurements.

26. The apparatus of claim 25, further comprising:
means for communicating with the controlling wireless device by cycling through the plurality of BPLs including the at least one other BPL and the other corresponding time and excluding the at least one BPL during a subsequent instance of the communication time period based at least in part on the configuration.

27. The apparatus of claim 24, further comprising:
means for pausing operations of the secondary wireless device while performing the set of measurements.

28. The apparatus of claim 23, wherein the configuration that modifies the communications with the controlling wireless device enables repeated transmissions during the portion of the communication time period.

29. The apparatus of claim 28, wherein:
the repeated transmissions comprise at least one of repetitions of a packet using a same BPL or repetitions of the packet using two or more different BPLs.

30. A non-transitory computer-readable medium storing code for wireless communications at a secondary wireless device, the code comprising instructions executable by a processor to:
communicate with a controlling wireless device by cycling through a plurality of beam pair links (BPLs) at respective times within a communication time period; and
receive, from the controlling wireless device, a configuration that modifies communications with the controlling wireless device during a portion of the communication time period, wherein the configuration is received based at least in part on at least one BPL of the plurality of BPLs having a link quality that does not satisfy a threshold during the portion of the communication time period.

* * * * *